US007297058B2

(12) United States Patent
Gomez et al.

(10) Patent No.: US 7,297,058 B2
(45) Date of Patent: Nov. 20, 2007

(54) GAMING MACHINE WITH INTEGRATED DISPLAY

(75) Inventors: Benjamin T. Gomez, Chicago, IL (US); Joel R. Jaffe, Evanston, IL (US); Larry J. Pacey, Northbrook, IL (US); Alfred Thomas, Las Vegas, NV (US)

(73) Assignee: WMS Gaming Inc., Waukegan, IL (US)

( * ) Notice: Subject to any disclaimer, the term of this patent is extended or adjusted under 35 U.S.C. 154(b) by 803 days.

(21) Appl. No.: 10/619,935

(22) Filed: Jul. 15, 2003

(65) Prior Publication Data

US 2005/0014547 A1 Jan. 20, 2005

(51) Int. Cl.
*G06F 17/00* (2006.01)

(52) U.S. Cl. .......................................... 463/16; 463/20

(58) Field of Classification Search ............ 463/16–29, 463/12–13; 273/138.1, 138.2, 139

See application file for complete search history.

(56) References Cited

U.S. PATENT DOCUMENTS

| | | | | |
|---|---|---|---|---|
| 6,254,481 | B1 | 7/2001 | Jaffe | 463/20 |
| 6,315,660 | B1 | 11/2001 | DeMar et al. | 463/16 |
| 6,364,766 | B1 | 4/2002 | Anderson et al. | 463/16 |
| 6,428,412 | B1 | 8/2002 | Anderson et al. | 463/9 |
| 6,517,433 | B2 | 2/2003 | Loose et al. | 463/20 |
| 6,554,704 | B2 | 4/2003 | Nicastro et al. | 463/20 |
| 7,018,293 | B2 * | 3/2006 | Brown et al. | 463/20 |
| 2002/0025844 | A1 | 2/2002 | Casey et al. | 463/16 |
| 2002/0094869 | A1 * | 7/2002 | Harkham | 463/42 |
| 2002/0137560 | A1 | 9/2002 | DeMar et al. | |
| 2002/0142832 | A1 * | 10/2002 | Loose et al. | 463/30 |
| 2005/0037843 | A1 * | 2/2005 | Wells et al. | 463/30 |

FOREIGN PATENT DOCUMENTS

| | | | |
|---|---|---|---|
| EP | 1 000 642 | A3 | 3/2001 |
| EP | 1 282 088 | A3 | 2/2003 |
| EP | 1 321 911 | A3 | 6/2003 |
| EP | 1 424 662 | A2 | 6/2004 |
| EP | 1 452 211 | A1 | 9/2004 |
| GB | 2 393 016 | | 3/2004 |
| WO | WO 03/063984 | A1 | 8/2003 |

* cited by examiner

*Primary Examiner*—Ronald Laneau
(74) *Attorney, Agent, or Firm*—Nixon Peabody

(57) ABSTRACT

A gaming apparatus for conducting a wagering game comprises a video screen for displaying a dynamic video image and a structure for displaying non-video artwork. The video and non-video artworks are visually linked to form an integrated image associated with the wagering game. The structure covers a portion, but not all, of the video screen. Thus, video images on conventional video screens may effectively be blended with non-video artwork to create entertaining and attractive displays.

31 Claims, 21 Drawing Sheets

GAMING MACHINE WITH INTEGRATED DISPLAY

FIELD OF THE INVENTION

The present invention relates generally to gaming machines and, more particularly, to a gaming machine having integrated video and non-video displays.

BACKGROUND OF THE INVENTION

Gaming machines, such as slot machines, video poker machines and the like, have been a cornerstone of the gaming industry for several years. Generally, the popularity of such machines with players is dependent on the likelihood (or perceived likelihood) of winning money at the machine and the intrinsic entertainment value of the machine relative to other available gaming options. Where the available gaming options include a number of competing machines and the expectation of winning each machine is roughly the same (or believed to be the same), players are most likely to be attracted to the most entertaining and exciting of the machines. Shrewd operators consequently strive to employ the most entertaining and exciting machines available because such machines attract frequent play and hence increase profitability to the operator.

To enhance the entertainment value of a gaming machine, gaming machines may include features such as an enhanced payoff and a "secondary" or "bonus" game which may be played in conjunction with a "basic" game. The bonus game may comprise any type of game, either similar to or completely different from the basic game, which is entered upon the occurrence of a selected event or outcome of the basic game. Generally, the features provide a greater expectation of winning than the basic game. Additionally, more attractive or unusual video displays and/or audio may accompany the basic and bonus games. The fanciful and visually appealing displays offer tremendous advantages in player appeal and excitement relative to other known games. Such games are attractive to both players and operators. Thus, there is a continuing need to develop new features for the displays and the basic and bonus games to satisfy the demands of players and operators. Preferably, such new features will maintain, or even further enhance, the level of player excitement. The present invention is directed to satisfying these needs.

SUMMARY OF THE INVENTION

In accordance with the foregoing, a gaming apparatus for conducting a wagering game comprises a video screen for displaying a dynamic video image and a structure for displaying non-video artwork. The video and non-video artworks are visually linked to form an integrated image associated with the wagering game. The structure covers a portion, but not all, of the video screen. Thus, video images on conventional video screens may effectively be blended with non-video artwork to create entertaining and attractive displays.

Additional aspects of the invention will be apparent to those of ordinary skill in the art in view of the detailed description of various embodiments, which is made with reference to the drawings, a brief description of which is provided below.

BRIEF DESCRIPTION OF THE DRAWINGS

The foregoing and other advantages of the invention will become apparent upon reading the following detailed description and upon reference to the drawings in which.

Figure 1:
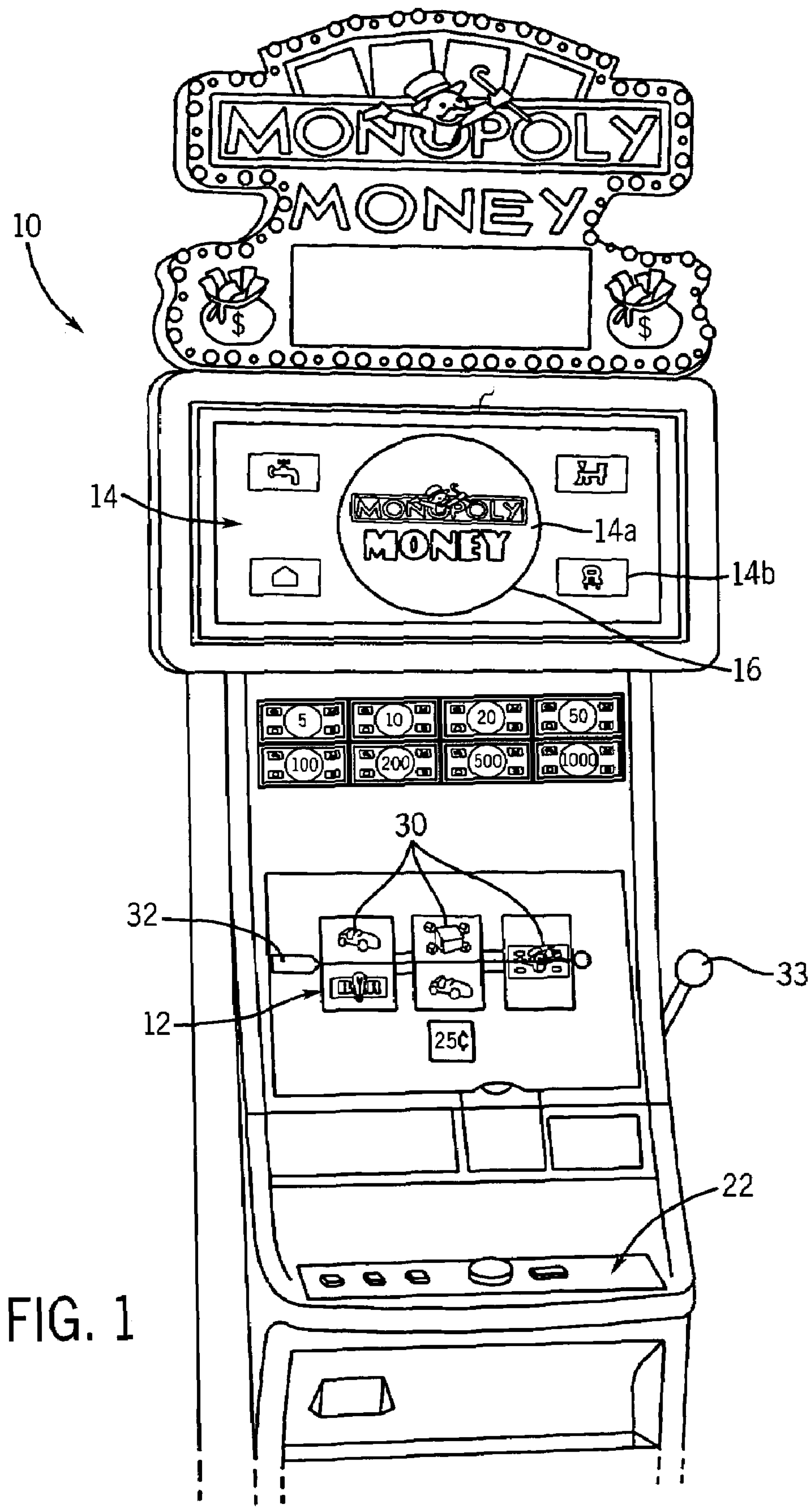
FIG. 1 is a perspective view of a gaming machine in accordance with one embodiment of the present invention.

While the invention is susceptible to various modifications and alternative forms, specific embodiments have been shown by way of example in the drawings and will be described in detail herein. However, it should be understood that the invention is not intended to be limited to the particular forms disclosed. Rather, the invention is to cover all modifications, equivalents, and alternatives falling within the spirit and scope of the invention as defined by the appended claims.

DESCRIPTION OF SPECIFIC EMBODIMENTS

Turning now to the drawings and referring initially to FIG. 1, there is shown a gaming machine 10 for conducting a wagering game in accordance with one embodiment of the present invention. The gaming machine 10 comprises a primary display 12 and an integrated secondary display 14. The display 12 may be a mechanical reel slot display or a video display. In accordance with the present invention, the integrated display 14 includes a video screen **14*a* for displaying a dynamic video image and a rectangular structure 14*b* for displaying non-video artwork. The display 12 (if implemented in video) and the video screen 14*a* may comprise a cathode ray tube (CRT), liquid crystal display (LCD), plasma, or generally any other type of video display known in the art. In the illustrated embodiment, the gaming machine 10 is an "upright" version in which the display 12 is oriented vertically relative to the player. It will be appreciated, however, that any of several other models of gaming machines are within the scope of the present invention including, for example, a "slant-top" version in which the display 12** is slanted at about a thirty-degree angle toward the player.

In the embodiment of FIG. 1, the structure 14*b* is preferably a flat plastic panel or "template" for displaying non-video artwork. The artwork covers a portion, but not all, of the video image on the video screen 14*a*. For example, if the video screen 14*a* is of a conventional type and has a generally rectangular shape, the artwork on the structure 14*b* preferably covers and conceals corner portions of the video screen 14*a*. The structure 14*b* may have a physical or "virtual" hole 16 for exposing a central portion of the video screen 14*a*. If the hole 16 is virtual, the structure 14*b* is solid throughout but has a central transmissive area for exposing the central portion of the video screen 14*a*. The transmissive area may be transparent or translucent depending upon the desired aesthetic effect. In the illustrated example, there is a single hole 16 having an oval shape. Alternatively, there may be multiple holes arranged in a regular or irregular formation. The holes may have the same shape or different shapes, and the shapes may be regular and/or irregular. For example, the holes may be circular, hexagonal, rectangular, square, triangular, etc.

In one embodiment, the gaming machine 10 is operable to play a game entitled Monopoly Money™ (MONOPOLY is a trademark of Hasbro, Inc. for its property trading game and equipment). The game features a basic reel slot game conducted on the display 12 with three mechanical reels 30 and a bonus game conducted on the integrated display 14. The video image on the video screen 14*a* and the non-video artwork on the structure 14*b* are visually linked or blended to form an integrated image associated with the wagering game. The term "integrated image" refers to a single image that is divided into portions (e.g., the video image and the non-video artwork) that are shown on the video screen 14*a* and the structure 14*b*. For example, if the integrated image is a Monopoly™ bill, a bill pattern may be printed in black on the front of the structure 14*b* and a bill value (e.g., $5, $10, $20, $50, etc.) may be shown on the video screen 14*a*. Although the following description describes the Monopoly Money game on the gaming machine 10, it will be appreciated that the gaming machine 10 may be implemented with different games and/or with any of several alternative game themes.

Figure 2:
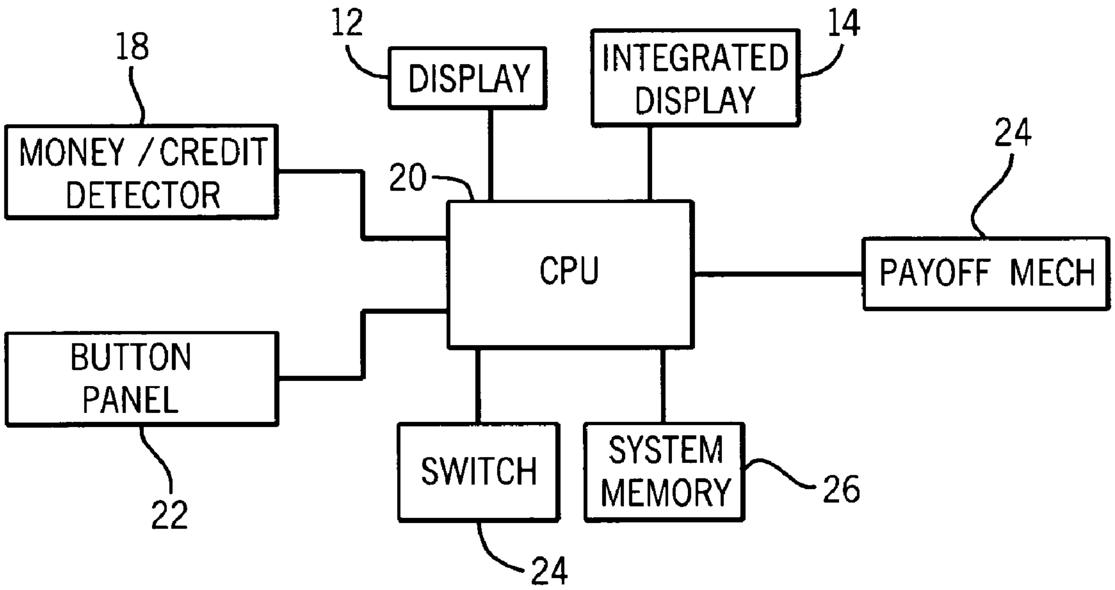
FIG. 2 is a block diagram of a control system suitable for operating the gaming machine.

FIG. 2 is a block diagram of a control system suitable for operating the gaming machine 10. Money/credit detector 18 signals a central processing unit (CPU) 20 when a player has inserted a number of coins or played a number of credits. Then, the CPU 20 operates to execute a game program which causes the display 12 to display the basic game that includes mechanical reels with symbols displayed thereon (see FIG. 1). The player may select a wager amount via input keys on a button panel 22. The basic game commences in response to the player activating a switch 24 (e.g., by pulling a handle or pushing a button), causing the CPU 20 to set the reels in motion, randomly select a game outcome and then stop the reels to display symbols corresponding to the pre-selected game outcome. In one embodiment, certain of the basic game outcomes cause the CPU 20 to enter a bonus mode causing the integrated display 14 to show a bonus game. In addition to the CPU 20, the control system may include one or more additional slave control units for operating one or more of the displays 12 and 14. The bonus game is described in detail below in relation to FIGS. 3 through 8.

A system memory 26 stores control software, operational instructions and data associated with the gaming machine 10. In one embodiment, the system memory 26 comprises a separate read-only memory (ROM) and battery-backed random-access memory (RAM). However, it will be appreciated that the system memory 26 may be implemented on any of several alternative types of memory structures or may be implemented on a single memory structure. A payoff mechanism 28 is operable in response to instructions from the CPU 20 to award a payoff of coins or credits to the player in response to certain winning outcomes which might occur in the basic game or bonus game. The payoff is determined by one or more math tables stored in the system memory 26.

Referring back to FIG. 1, to play the Monopoly Money basic game, a player places a wager using a "bet one" key or a "max bet" key on the button panel 22. In response to pressing the "max bet" key, or a "spin reels" key for a wager less than the maximum, the CPU spins and randomly stops the plurality of symbol-bearing reels 30 to place symbols on the reels 30 in visual association with at least one pay line 32. Other mechanisms, such as a handle 33, may be used to set the reels 30 in motion. Additional pay lines may be provided, in which case the player is allowed to select which pay lines to activate and the wager amount for each activated pay line. The number of illustrated reels is three but a different number of reels may be provided if desired. In the illustrated example, the reels 30 are physical and rotatably driven by stepper motors. If, however, the display 12 is video, the reels are simulated with moving graphics.

The CPU uses a random number generator to select a game outcome (e.g., "basic" game outcome) corresponding to a particular set of reel "stop positions." The CPU then causes each of the reels 30 to stop at the appropriate stop position. Symbols are displayed on the reels 30 to graphically illustrate the reel stop positions and indicate whether the stop positions of the reels 30 represent a winning game outcome.

Winning basic game outcomes (e.g., symbol combinations resulting in payment of coins or credits) are identifiable to the player by a pay table. The pay table may be affixed to the machine 10 and/or displayed by the video screen 14*a* in response to a command by the player (e.g., by pressing a "pay table" key on the button panel 22). A winning basic game outcome occurs when the symbols appearing on the reels 30 along the pay line 32 correspond to one of the winning combinations on the pay table. A winning combination could, for example, be two or more matching symbols along the pay line 32, where the award is greater as the number of matching symbols along the pay line 32 increases. If the displayed symbols stop in a winning combination, the game credits the player an amount corresponding to the award in the pay table for that combination multiplied by the number of wagered credits. The player may collect the amount of accumulated credits by pressing a "collect" key on the button panel 22.

Included among the plurality of basic game outcomes are one or more start-bonus outcomes for triggering play of bonus games. A start-bonus outcome may be defined in any number of ways. For example, a start-bonus outcome may occur when a special start-bonus symbol or a special combination of symbols appears on one or more of the reels 30. A start-bonus outcome may require the combination of symbols to appear along the pay line 32, or may alternatively require that the combination of symbols appear anywhere on the display regardless of whether the symbols are along the pay line 32. The appearance of a start-bonus outcome causes the CPU to shift operation from the basic slot game to the bonus game associated with that start-bonus outcome. In the illustrated example, a Money symbol 34 along the pay line 32 with a maximum wager (e.g., 3 credits) triggers the Money bonus game.

Figure 3:
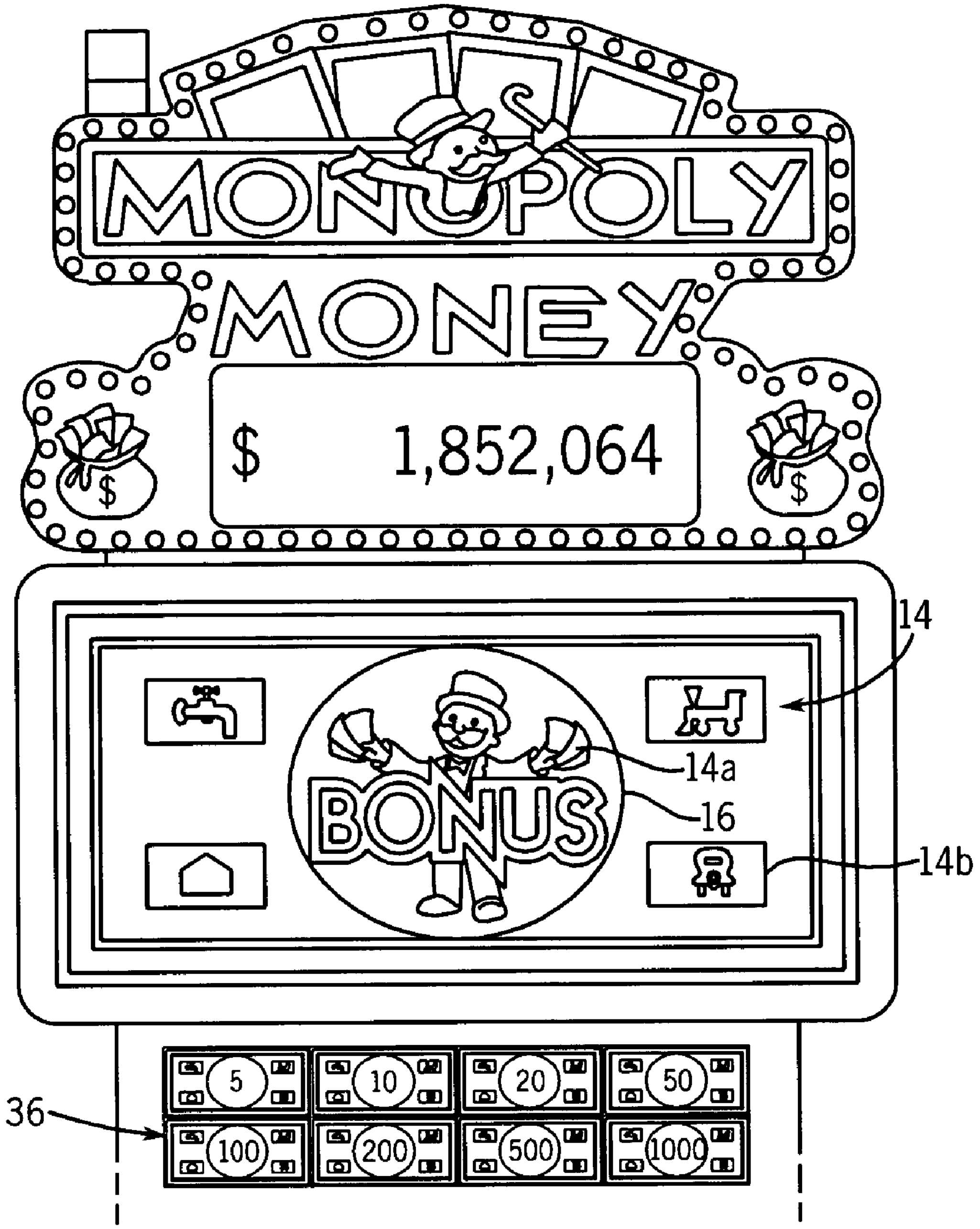
FIGS. 3 through 8 are enlarged front views of an integrated bill display used in a top box of the gaming machine in FIG. 1, showing its use to conduct a bonus game on the gaming machine.

Referring to FIG. 3, the Money bonus game is conducted on the integrated display 14. The display 14 presents an integrated image of a Monopoly™ bill. The integrated image of the bill is formed by (i) non-video artwork of a bill pattern that is printed in black on the front of the structure 14*b* and (ii) a video image of a bill value (e.g., $5, $10, $20, $50, $100, $200, $500, and $1000) that is shown on the video screen 14*a*. The artwork on the structure 14*b* preferably covers corner portions of the video screen 14*a* and has an oval hole 16 for exposing a central portion of the video screen 14*a*. The video screen 14*a* depicts a video image of the bill value in this exposed central portion.

The structure 14*b* is preferably made of clear acrylic that has a series of computer-controlled light-emitting diodes (LEDs) around its border. The series of LEDs include red (R), blue (B), and green (G) LEDs. The CPU controls which LEDs are "on" and which LEDs are "off" so that the acrylic can take on any RGB color. The bill pattern is printed in black on the front of the acrylic. Below the integrated display 14 is a row of eight Monopoly bills 36 of different denominations. The bills 36 are printed on the acrylic in colors corresponding to their respective denominations. The bills 36 are backlit with respective shadowboxes individually controlled by the CPU.

Figure 4:
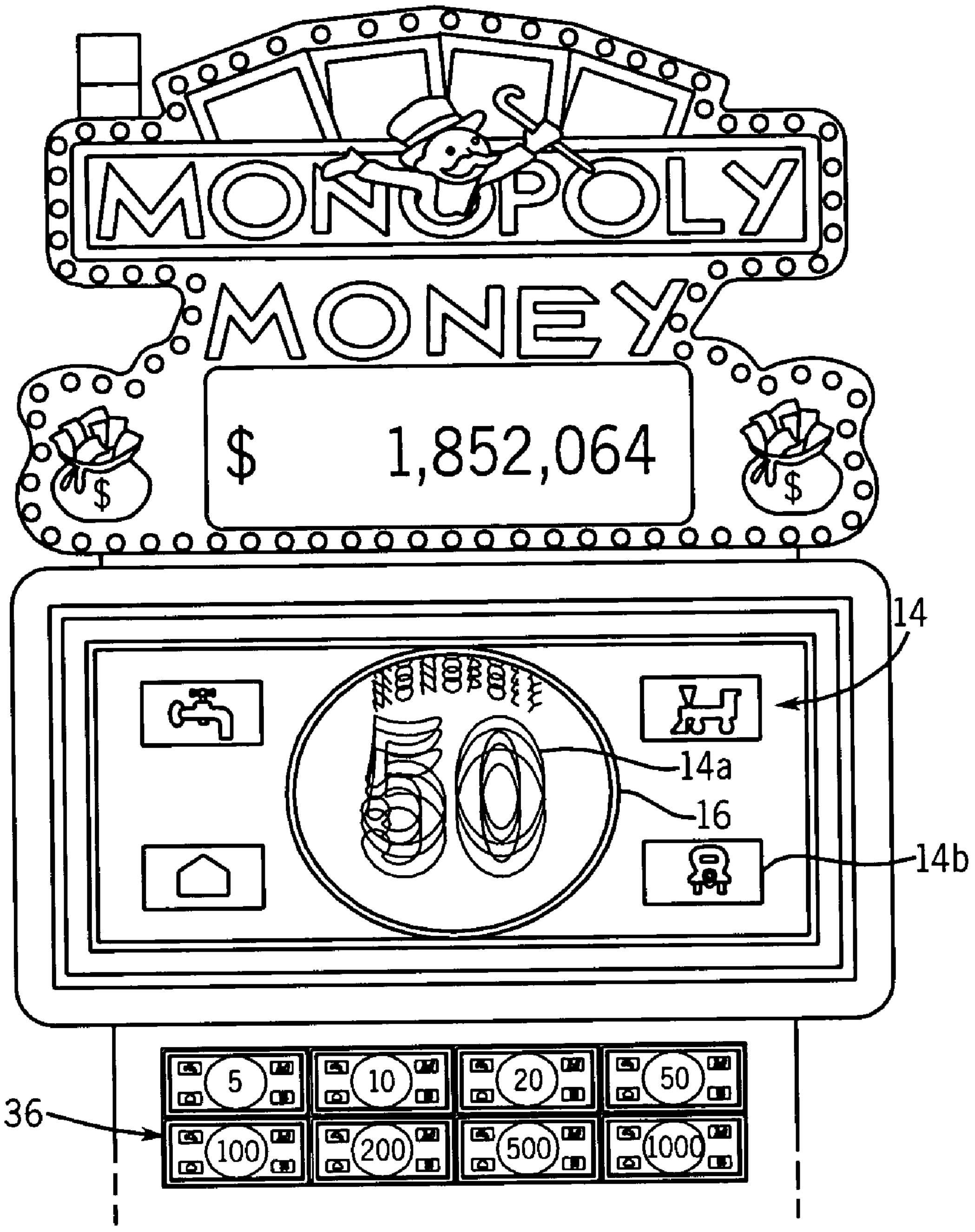

The Money bonus game proceeds as follows. Referring to FIG. 4, the CPU controls the LEDs to randomly cycle the structure 14*b* through all the colors. The colors may, for example, include pink for $5, yellow for $10, light green for $20, light blue for $50, goldenrod for $100, purple for $200, yellow-gold for $500, and dark green for $1000. In synchronicity with the cyclic changes in the colors of the structure 14*b*, the CPU controls the video screen 14*a* to change the bill value (number) of the bill to correspond with the color currently displayed on the structure. The CPU also controls the bills 36 to illuminate the bill currently displayed on the integrated display 14 (by the video screen 14*a* and structure 14*b*). Thus, the value and color of the bills flash in synchronicity with each other and preferably at a rate of approximately five bills per second. To further integrate the video image of the bill value on the video screen 14*a* with the non-video artwork of the colored bill pattern on the structure 14*b*, the exposed oval portion of the video screen 14*a* also depicts a background color corresponding to the color currently displayed on the structure 14*b*.

The player is then prompted to press a "play bonus" button on the button panel 22 (see FIG. 1) to attempt to stop the cycling bill on a specific value. While the player may perceive that he or she has the ability to stop the bill on a specific value, the random outcome is actually predetermined and out of the player's control. In response to the player pressing the "play bonus" button, the bill stops on a bill value with associated color.

Figure 5:
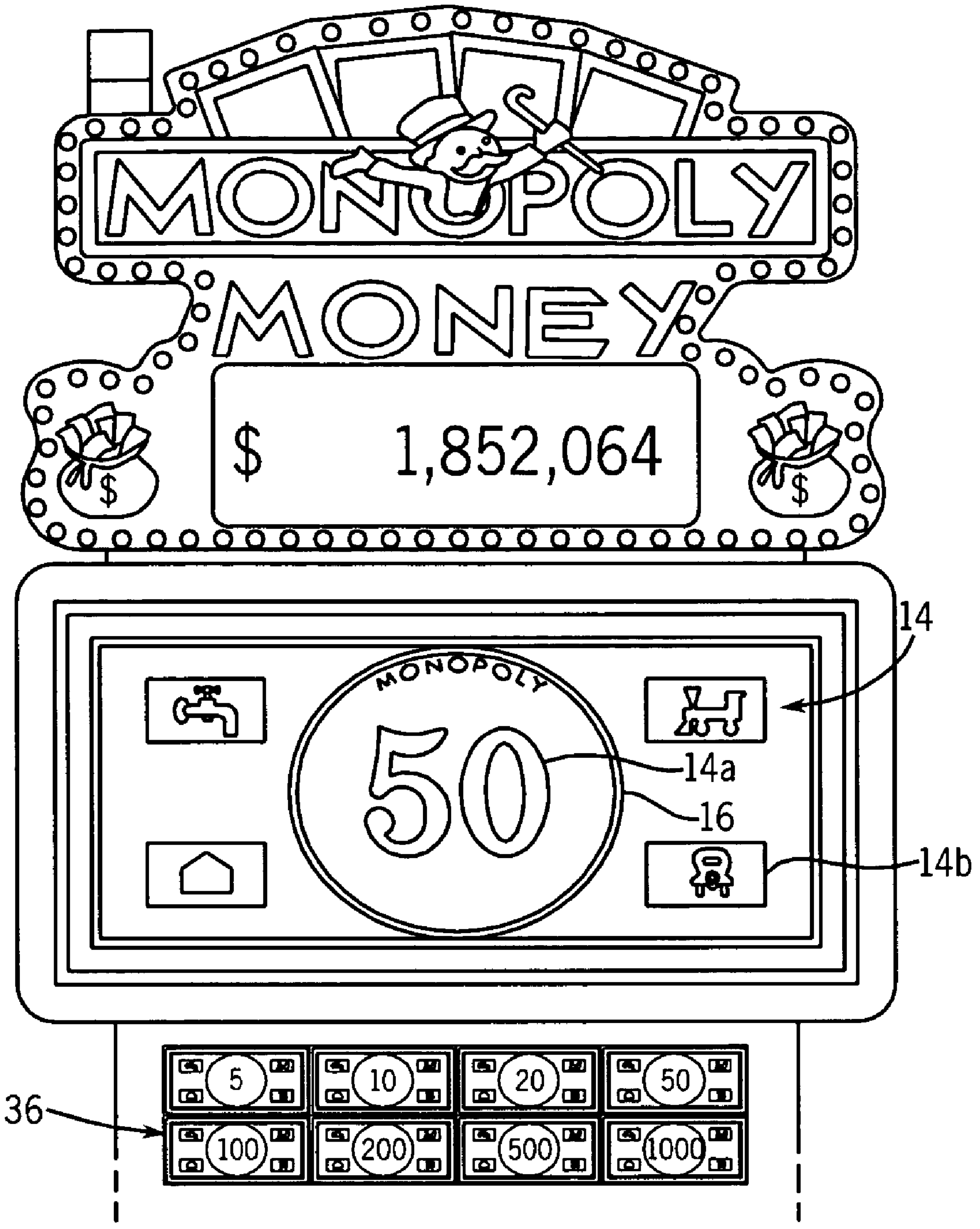

Referring to FIG. 5, in the illustrated example the bill stops on a $50 Monopoly bill. The CPU, in turn, awards the value of that bill in credits to the player. The CPU then causes the integrated display 14 to resume the synchronized cycling of the bill between different values and their associated colors. The player is again prompted to press the "play bonus" button on the button panel 22 (see FIG. 1).

Figure 6:
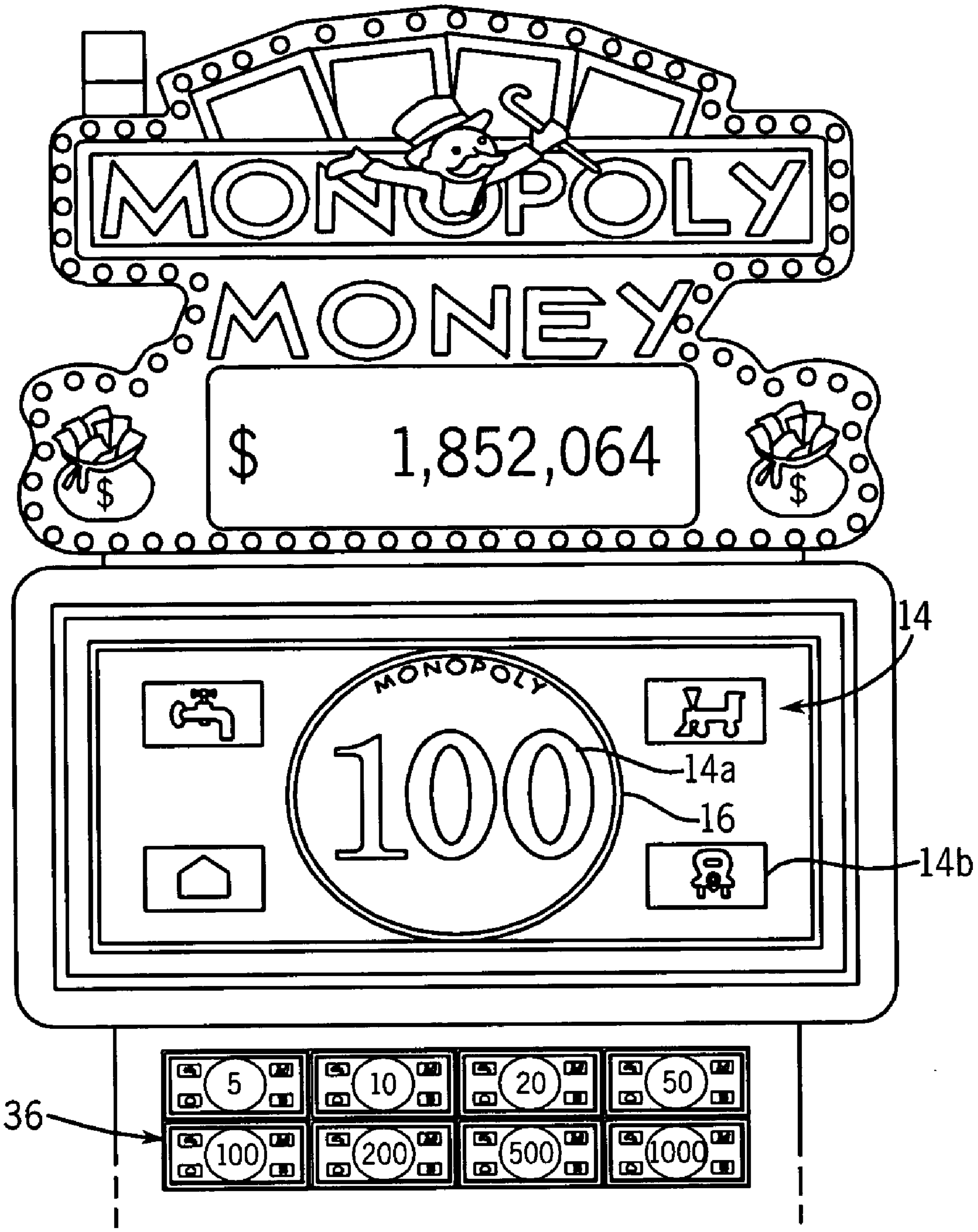
Figure 7:
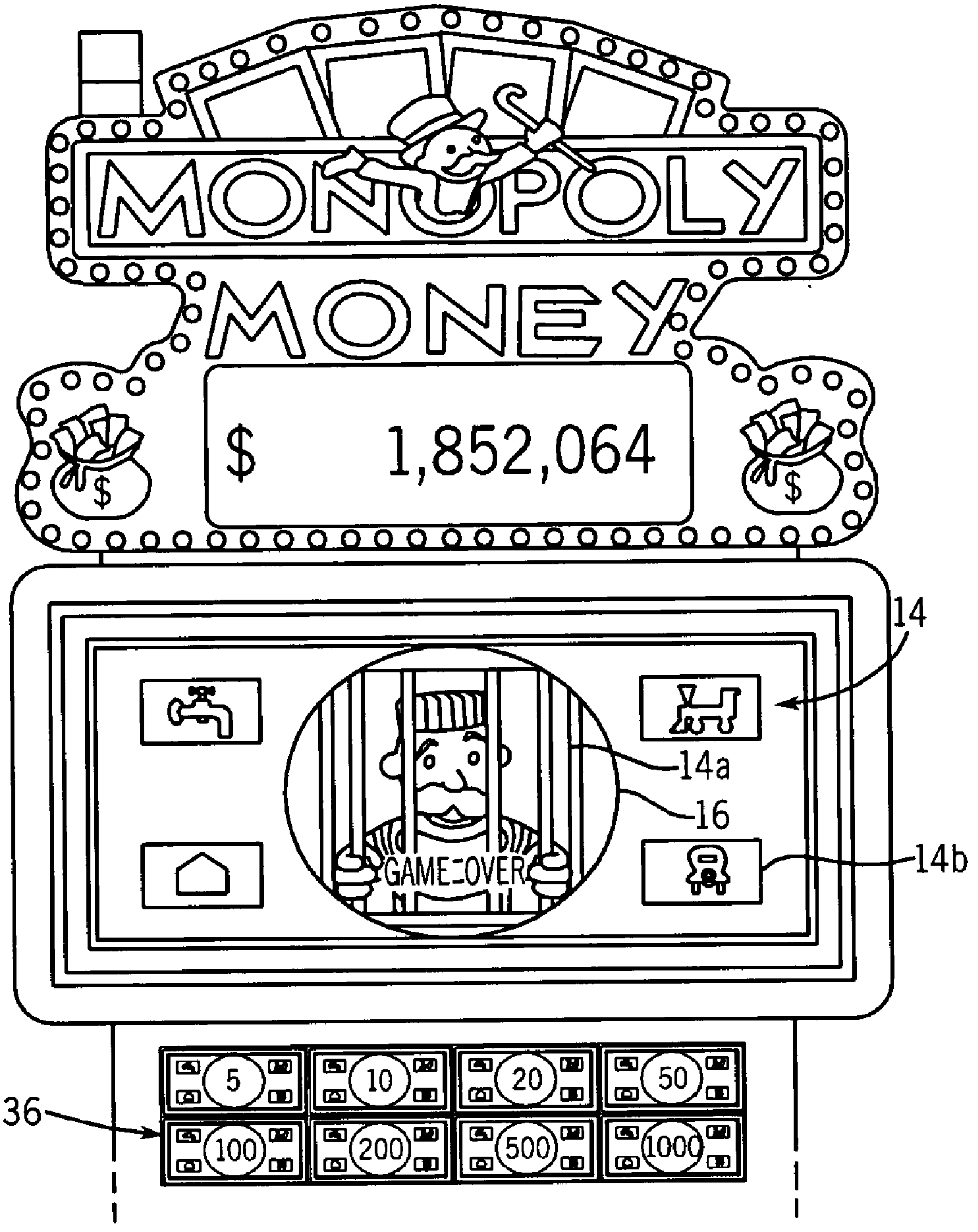

Referring to FIG. 6, in the illustrated example the bill stops on a $100 Monopoly bill. The CPU, in turn, awards the value of that bill in credits to the player. The CPU then causes the integrated display 14 to again resume the synchronized cycling of the bill between different values and their associated colors. The player is again prompted to press the "play bonus" button on the button panel 22 (see FIG. 1).

The bonus game continues in the above manner until a character such as Mr. Monopoly™ is shown in jail on the video screen 14*a* as in FIG. 7. The appearance of the jailed character is a termination event that first awards 5 additional credits but then terminates the bonus game. In the illustrated example, the bonus game awarded a total of 155 credits (i.e., 50+100+5).

Figure 8:
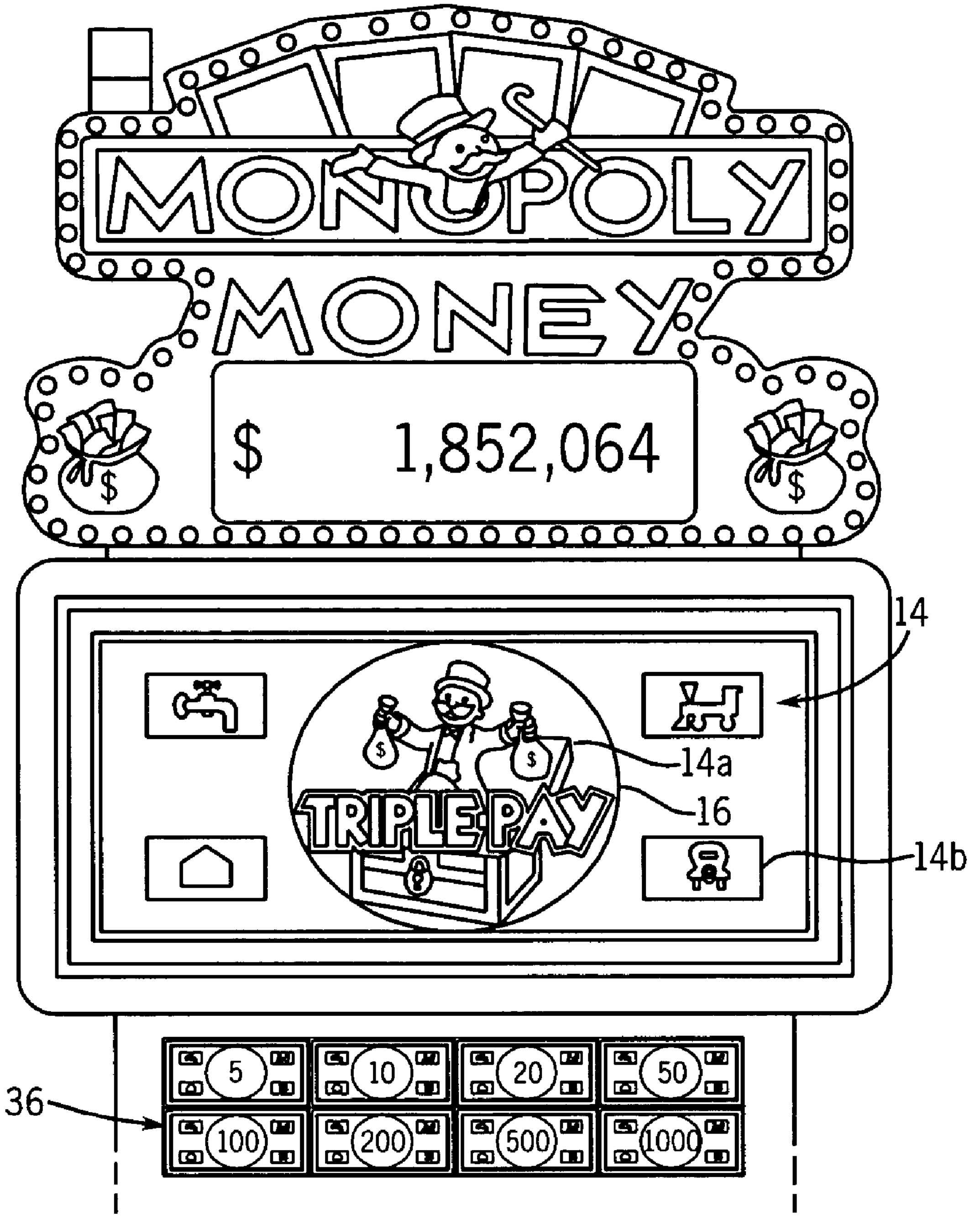

Referring to FIG. 8, if at any time during the bonus game a Chance or Community Chest appears on the video screen 14*a*, the value of all the bills in the bonus game are doubled or tripled, respectively. FIG. 8, for example, depicts a Community Chest that triples the value of all the bills in the bonus game.

The bonus game algorithm preferably works as follows. At the beginning of the bonus game, the game software selects all bill outcomes (i.e., values on which the bill stops) that are to occur during the bonus game. Each bill is selected from a weighted table and, depending upon the outcome of the bill, the software branches to a different weighted table. After determining how many bills will be in the bonus game, the order of the bill outcomes is randomized. The bonus game preferably awards between one and seven bills prior to termination. If a double or triple pay is to occur, it is preferably never the last bill in the order. At the conclusion of the bonus game, the CPU shifts operation back to the basic slot game.

Figure 9:
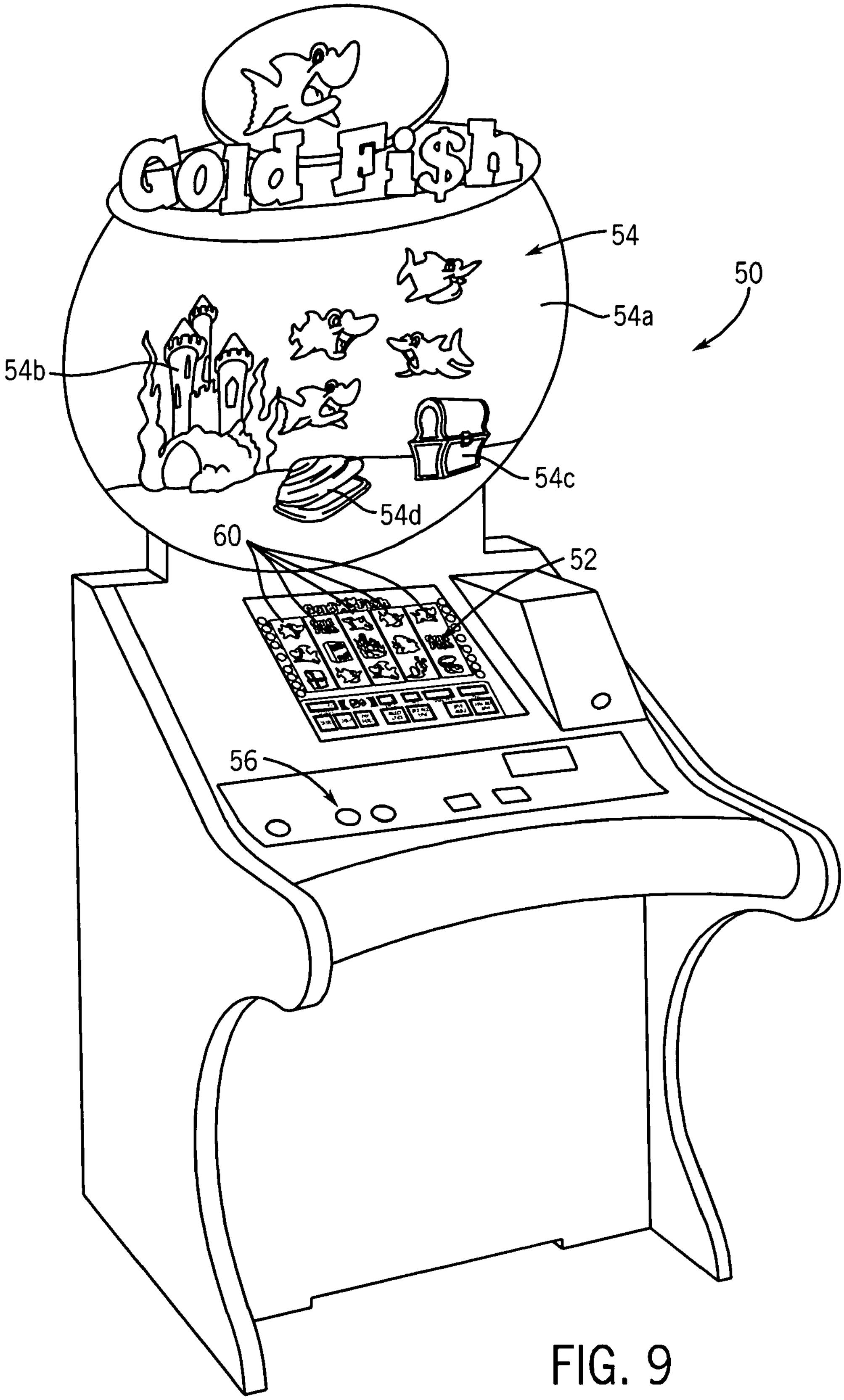
FIG. 9 is a perspective view of a gaming machine in accordance with another embodiment of the present invention.

Referring now to FIG. 9, there is shown a gaming machine 50 for conducting a wagering game in accordance with another embodiment of the present invention. The gaming machine 50 comprises a primary display 52 and an integrated secondary display 54. The display 52 may be a mechanical reel slot display or a video display. If the display 52 is implemented in video, it is preferably outfitted with a touch screen so that game options may be selected via the touchscreen and/or a button panel 56. In accordance with the present invention, the integrated display 54 includes a video screen 54*a* for displaying a dynamic video image and various structures 54*b-d* for displaying non-video artwork. The display 52 (if implemented in video) and the video screen 54*a* may comprise a cathode ray tube (CRT), liquid crystal display (LCD), plasma, or generally any other type of video display known in the art. In the illustrated embodiment, the gaming machine 50 is a "slant-top" version in which the display 52 is slanted at about a thirty-degree angle toward the player. It will be appreciated, however, that any of several other models of gaming machines are within the scope of the present invention including, for example, an "upright" version in which the display 52 is oriented vertically relative to the player.

In the embodiment of FIG. 9, the structures 54*b-d* are preferably sculptures, figurines, appliques, flat artwork panels, or decals that display non-video artwork and cover respective areas, but not all, of the video image on the video screen 54*a*. The structures 54*b-d* may, for example, be suspended in front of the video screen 54*a*, affixed to the video screen 54*a*, or affixed to a transparent panel that is in turn mounted in front of the video screen 54*a*. In the case of the latter arrangement, if the structures 54*b-d* are affixed to a rear surface of the transparent panel, the transparent panel is spaced from the video screen 54*a* by a sufficient distance to provide space for the structures 54*b-d* between the panel and the screen 54*a*.

Figure 10:
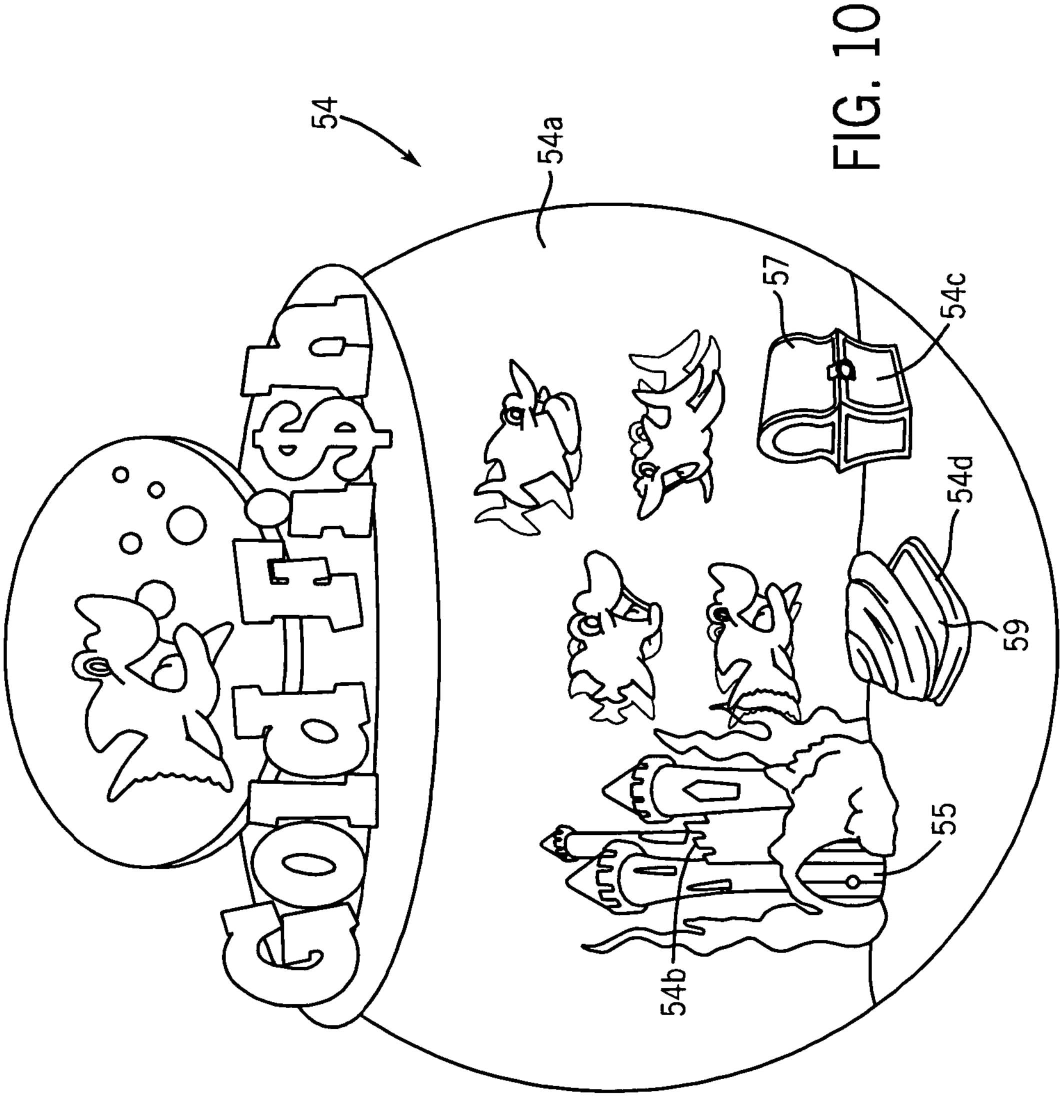
FIG. 10 is an enlarged front view of an integrated fish bowl display used in a top box of the gaming machine in FIG. 9.

In one embodiment, the gaming machine 10 is operable to play a game entitled Gold Fi$h™. The game features a basic reel slot game conducted on the display 52 with five simulated reels 60 and a bonus game conducted on the integrated display 54. Referring to FIG. 10, the video image on the video screen 54*a* and the non-video artwork on the structures 54*b-d* are visually linked or blended to form an integrated image associated with the wagering game. For example, if the integrated image is a fish bowl, some contents of the fish bowl (e.g., fish, water, plants, sand, gravel, etc.) may be shown on the video screen 54*a* and other contents of the fish bowl (e.g., ornaments or portions thereof) may be formed by the structures 54*b-d*. In the illustrated example, the structures 54*b-d* include a castle 54*b* (except for the door 55), a treasure chest 54*c* (except for the lid 57), and a clam shell 54*d* (except for the interior 59). The remainder of the fish bowl, as well as the door 55 of the castle 54*b*, the lid 57 of the treasure chest 54*c*, and the interior 59 of the clam shell 54*d*, are implemented with the video screen 54*a*. Although the following description describes the Gold Fi$h game on the gaming machine 50, it will be appreciated that the gaming machine 50 may be implemented with different games and/or with any of several alternative game themes.

Figure 11:
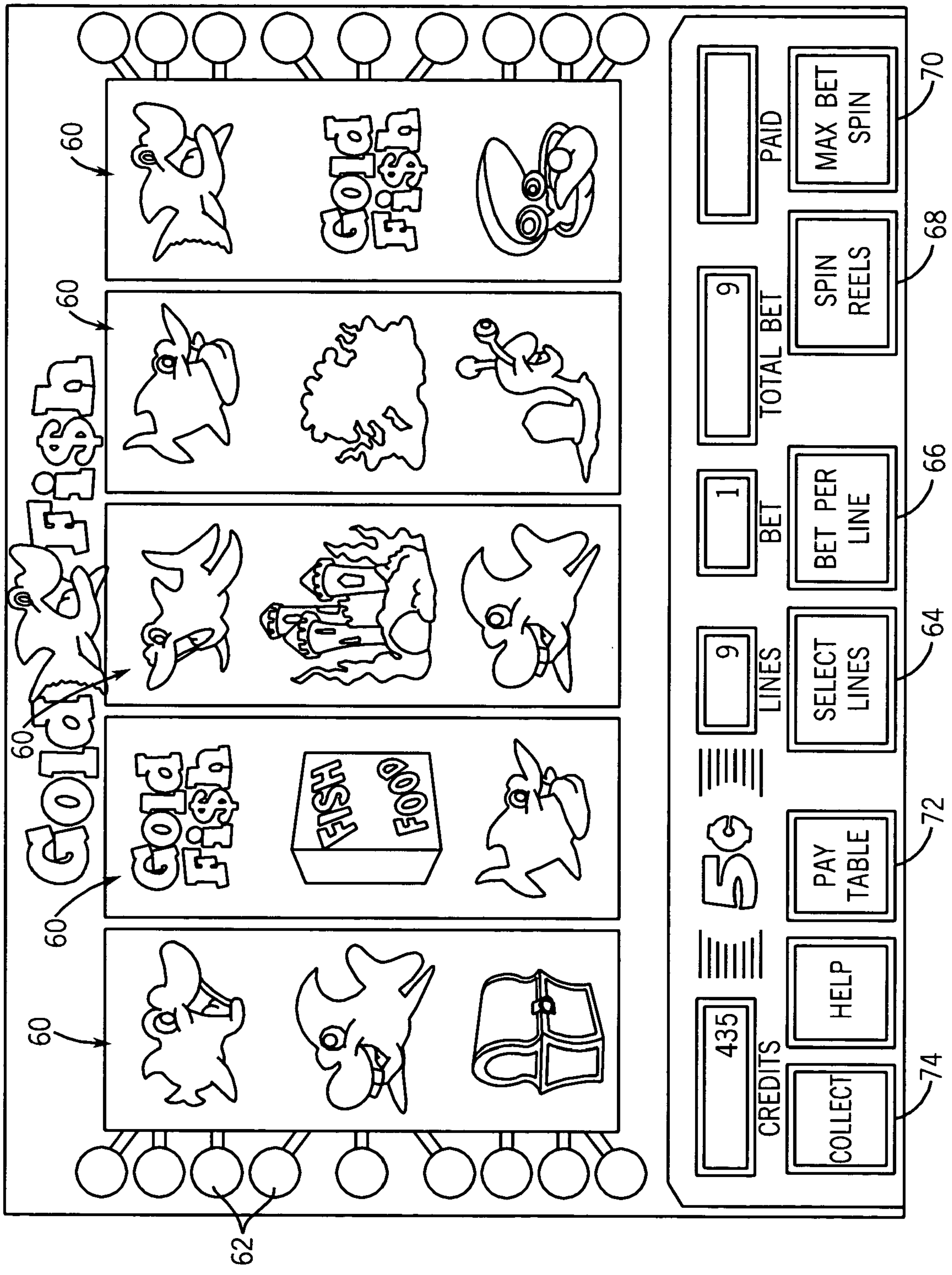
FIG. 11 is a display image associated with a basic slot game conducted on the gaming machine in FIG. 9.

Referring to FIG. 11, the Gold Fi$h basic game includes five simulated reels 60 and a number of pay lines 62. In the illustrated example, the number of reels 60 is five and the number of pay lines 62 is nine. The number of reels 60 and pay lines 62 may, however, be varied to be more or less than the number illustrated. Each of the pay lines 62 extends through one symbol on each of the reels 60.

Generally, game play is initiated by inserting money or playing a number of credits, causing the CPU to activate a number of pay lines 62 corresponding to the amount of money or number of credits played. In one embodiment, the player selects the number of pay lines 62 (between one and nine) to play by pressing a "Select Lines" key 64. The player then chooses the number of coins or credits to wager on the selected pay lines 62 by pressing a "Bet Per Line" key 66. After selecting a number of pay lines 62 and a wager amount, the reels 60 may be set in motion by touching a "Spin Reels" key 68 or, if the player wishes to bet the maximum amount per line, by using a "Max Bet Spin" key 70. Alternatively, other mechanisms such as a lever or push button may be used to set the reels 60 in motion.

Figure 12:
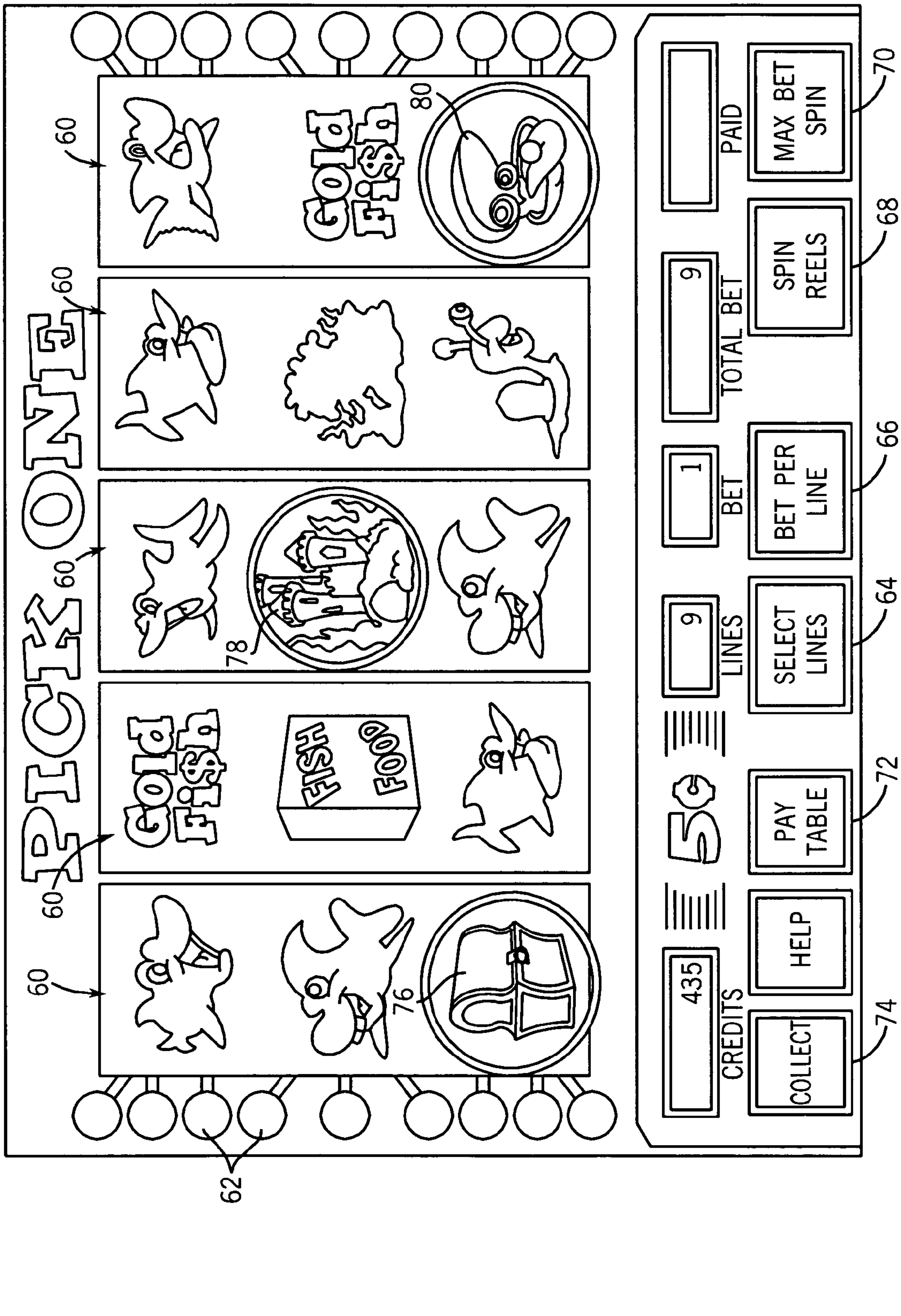
FIG. 12 is a display image associated with the basic slot game and showing a symbol combination for triggering a bonus game.

As discussed above in connection with the Monopoly Money game, the CPU uses a random number generator to select a game outcome (e.g., "basic" game outcome) corresponding to a particular set of reel "stop positions" and then causes each of the reels 60 to stop at the appropriate stop position. Winning basic game outcomes (e.g., symbol combinations resulting in payment of coins or credits) are identifiable to the player by a pay table. In one embodiment, the pay table is affixed to the machine 50 and/or displayed by the video display 52 in response to a command by the player (e.g., by pressing a "Pay Table" button 72). The player may collect the amount of accumulated credits by pressing a "Collect" button 74. Included among the plurality of basic game outcomes are one or more start-bonus outcomes for triggering play of bonus games. Referring to FIG. 12, in the illustrated example the appearance of a Chest symbol 76, a Castle symbol 78, and a Clam symbol 80 in any position on the first, third, and fifth reels 60 triggers a Fish Bowl bonus game.

Figure 13:
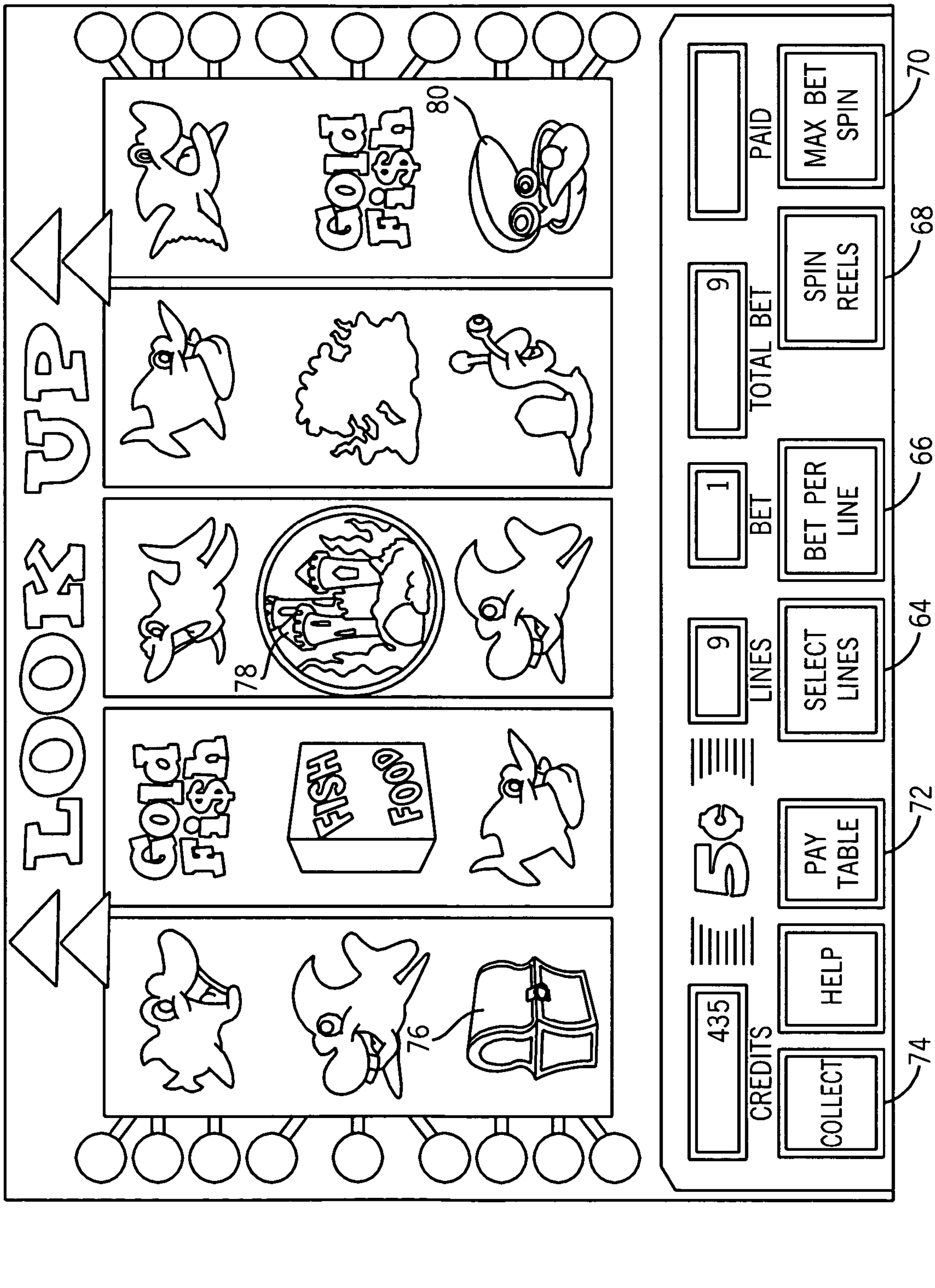
FIG. 13 is a display image after one of the symbols of the symbol combination in FIG. 12 has been selected by a player.

The Fish Bowl bonus game proceeds as follows. Referring to FIG. 13, the player is prompted to select one of the three triggering symbols 76, 78, and 80. In the illustrated example, the player selects the Castle symbol 78. The player is then prompted to look up at the fish bowl formed by the integrated display 54.

Figure 14:
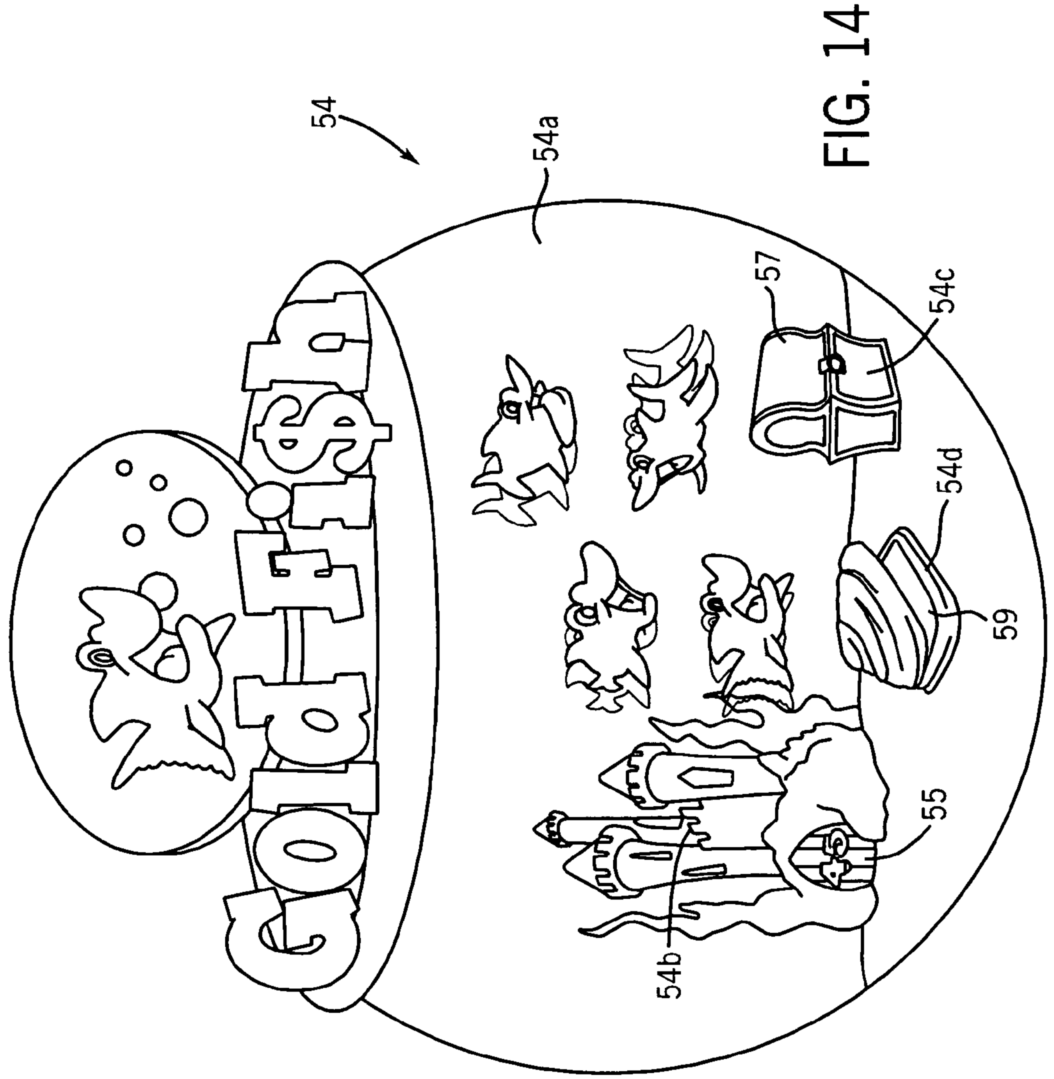
FIG. 14 is an enlarged front view of the integrated fish bowl display showing an award yielded by the symbol selected in FIG. 13.

Referring to FIG. 14, in the illustrated example the video door 55 of the castle structure 54*b* in the fish bowl opens to reveal an award of 45 credits. As noted above, the structures 54*b* include the castle 54*b* (except for the door 55), a treasure chest 54*c* (except for the lid 57), and a clam shell 54*d* (except for the interior 59). The door 55 of the castle 54*b*, however, is implemented with the video screen 54*a*. Therefore, the door 55, the opening thereof, and the award are shown in video. Alternatively, the door 55 may be a physical component concealing a portion of the video screen 54*a* and operatively connected by a hinge to the castle 54*b*. When the door 55 opens about the hinge, the door 55 reveals the previously concealed portion of the video screen 54*a* which, in turn, displays the award. In a similar manner, if the player had selected the Chest symbol 76 or the Clam symbol 80 in FIG. 12, an award would have been revealed by the video lid 57 of the treasure chest 54*c* or the video interior 59 of the clam 54*d*, respectively. In addition, other bonus games may utilize the integrated display 54 to display animations and award bonuses. At the conclusion of the bonus game, the CPU shifts operation back to the basic slot game.

Figure 15:
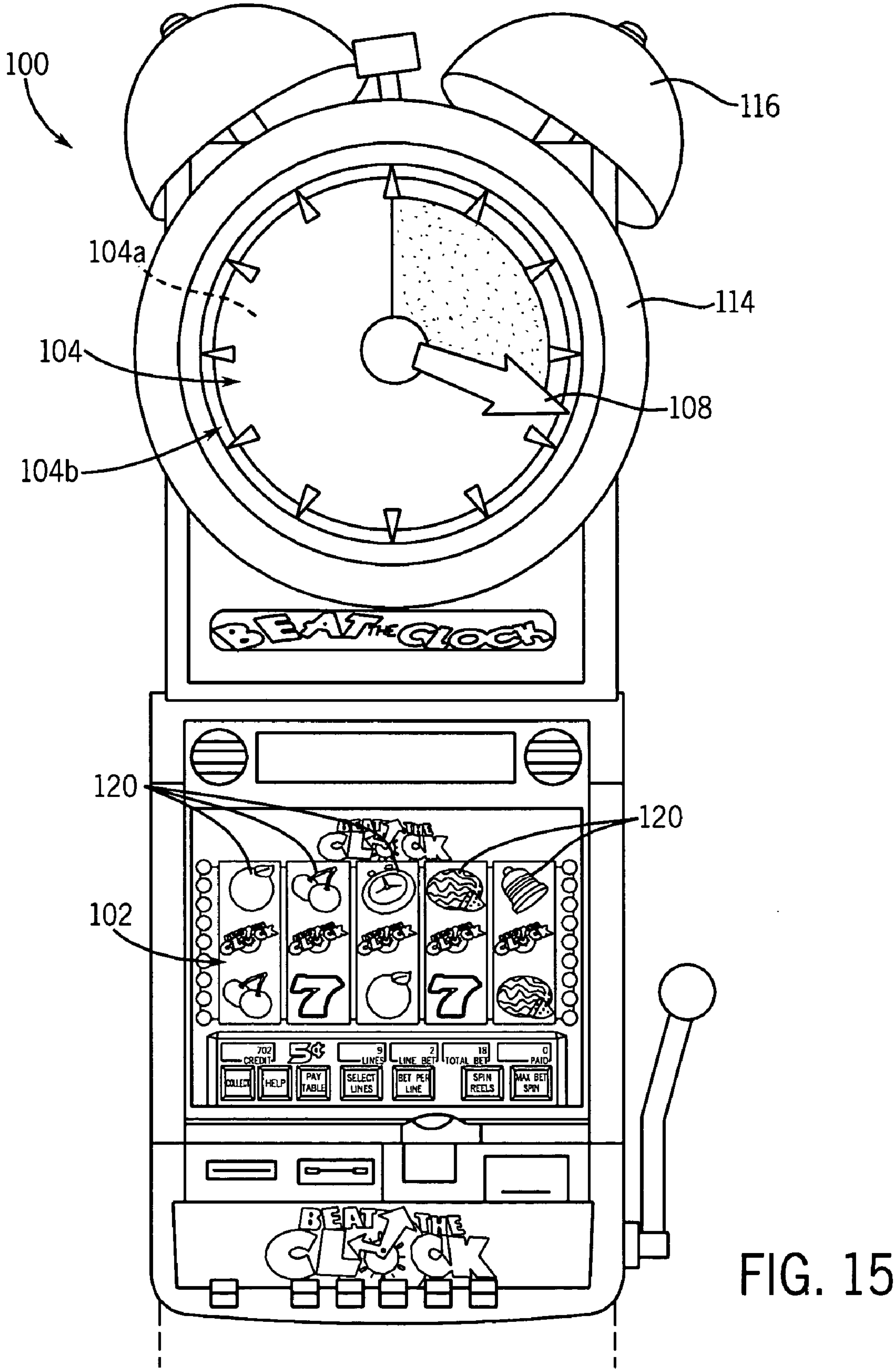
FIG. 15 is a front view of a gaming machine in accordance with yet another alternative embodiment of the present invention.

Referring now to FIG. 15, there is shown a gaming machine 100 for conducting a wagering game in accordance with yet another embodiment of the present invention. The gaming machine 100 comprises a primary display 102 and an integrated secondary display 104. The display 102 may be a mechanical reel slot display or a video display. In accordance with the present invention, the integrated display 104 include a video screen 104*a* for displaying a dynamic video image and an assembled clock structure 104*b* for displaying non-video artwork. The display 102 (if implemented in video) and the video screen 104*a* may comprise a cathode ray tube (CRT), liquid crystal display (LCD), plasma, or generally any other type of video display known in the art. In the illustrated embodiment, the gaming machine 100 is an "upright" version in which the display 102 is oriented vertically relative to the player. It will be appreciated, however, that any of several other models of gaming machines are within the scope of the present invention including, for example, a "slant-top" version in which the display 102 is slanted at about a thirty-degree angle toward the player.

Figure 16:
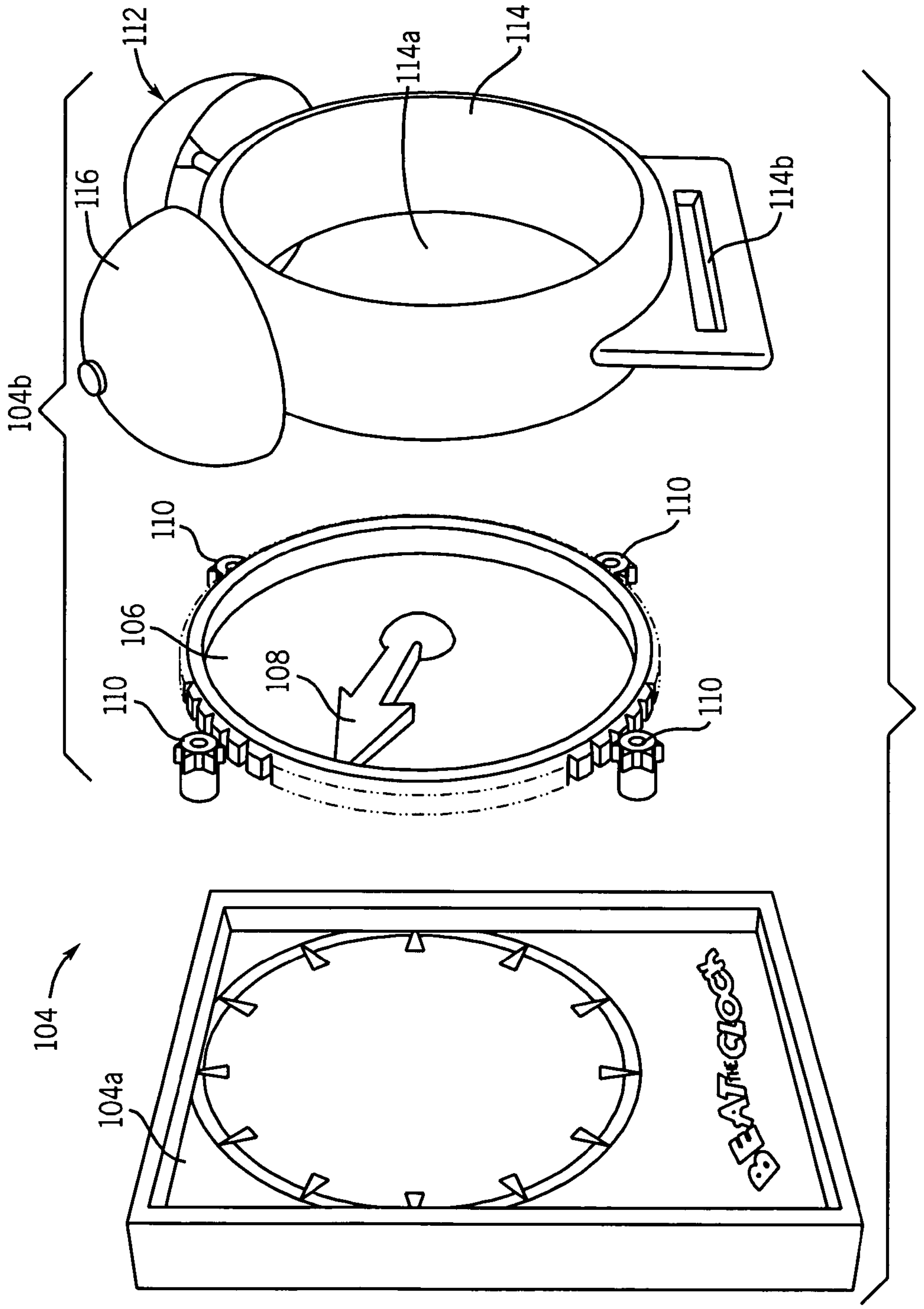
FIG. 16 is an exploded perspective view of an integrated clock display used in a top box of the gaming machine in FIG. 15.

Referring to FIG. 16, the clock structure 104*b* preferably includes a rotatable disc 106 and a bezel/bell assembly 112. The rotatable disc 106 is mounted in front of the video screen 104*a* and is preferably comprised of a clear plastic disc with an integrated opaque pointer or hand 108. The pointer 108 is molded with the disc. Because the disc 106 is clear (except for the pointer 108), the disc 106 exposes the underlying video screen 104*a*. The video screen 104*a* may display a video image of a marked dial that, in conjunction with the pointer 108, indicates "time". Thus, the physical pointer 108 points at a position on the video dial. To transmit rotating motion to the disc 106, a plurality of gears 110 are positioned adjacent to the toothed periphery of the disc 106. The teeth of the gears 110 mesh with the teeth along the disc's periphery.

The bezel/bell assembly 112 includes a molded opaque plastic bezel 114 and a bell ringing assembly 116. The bezel 114 is mounted in front of both the video screen 104*a* and the rotatable disc 106. In the illustrated example, the bezel 114 divides the video screen 104*a* into two parts: the video dial and a rectangular message area. A round window 114*a* in the bezel 114 reveals the video dial, and a rectangular window 114*b* in the bezel 114 reveals the message area.

Referring back to FIG. 15, in one embodiment the gaming machine 100 is operable to play a game entitled Beat the Clock™ based on the popular, classic TV game show of the same name. BEAT THE CLOCK is a trademark of FremantleMedia North America, Inc for its TV game show. The game features a basic reel slot game conducted on the display 102 with five simulated reels 120 and a bonus game conducted on the integrated display 104. The video image on the video screen 104*a* and the non-video artwork on the clock structure 104*b* are visually linked or blended to form an integrated image associated with the wagering game. For example, if the integrated image is an alarm clock, such clock elements as a marked dial with countdown effect may be shown on the video screen 104*a* and other clock elements such as a clock hand 108, bezel 114, and bell ringer 116 may be formed by the structure 104*b*. The video screen 104*a* may also display other animated features, reel symbols, bonus amounts, etc. The message area may, for example, display a game logo, instructions, bonus amounts, and other messages. Although the following description describes the Beat the Clock game on the gaming machine 100, it will be appreciated that the gaming machine 100 may be implemented with different games and/or with any of several alternative game themes.

Figure 17:
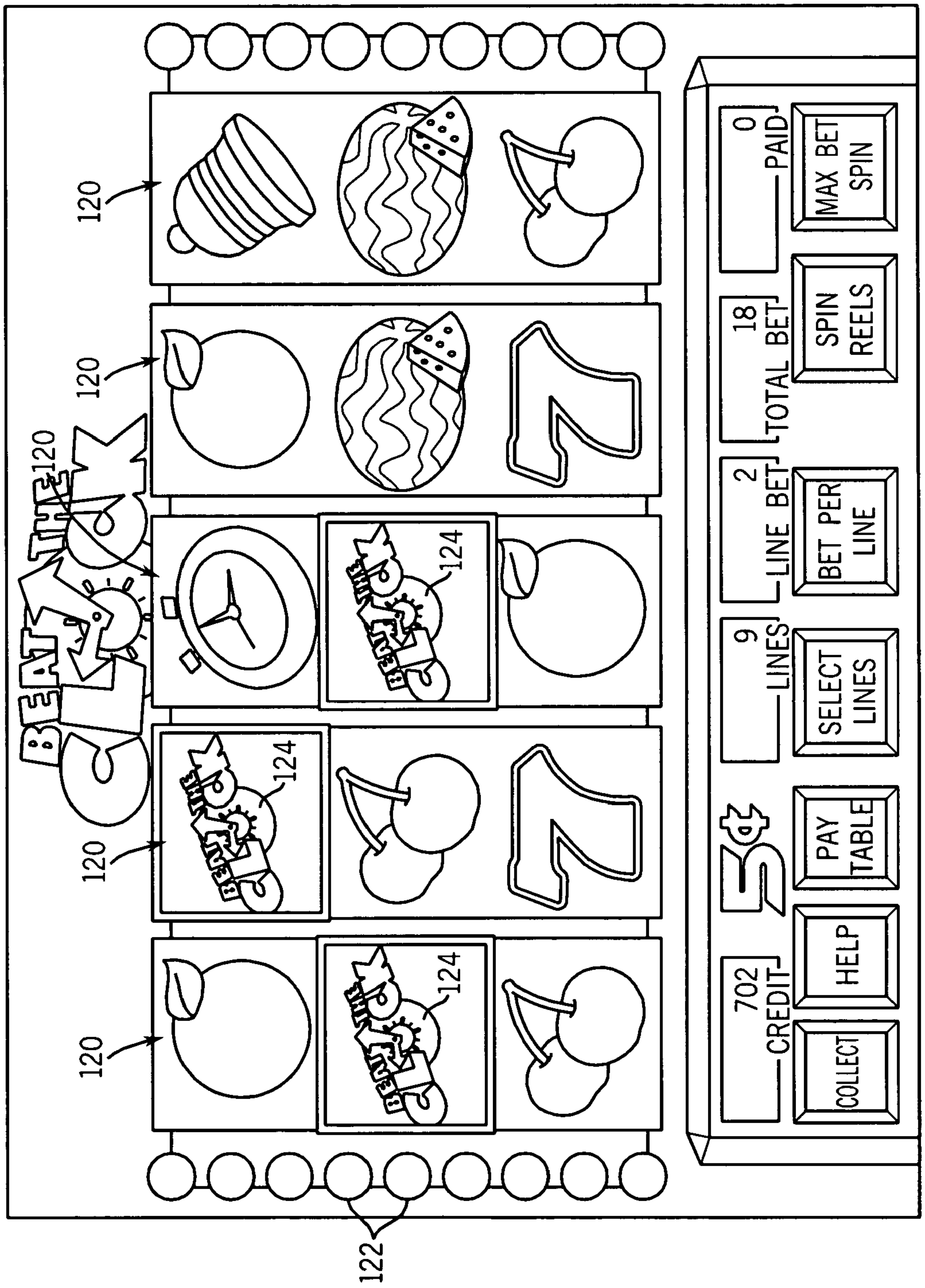
FIG. 17 is a display image associated with the basic slot game conducted on the gaming machine in FIG. 15 and showing a symbol combination for triggering a bonus game.

Referring to FIG. 17, the Beat the Clock basic game includes five simulated reels 120 and a number of pay lines 122. In the illustrated example, the number of reels 120 is five and the number of pay lines 122 is nine. The number of reels 120 and pay lines 122 may, however, be varied to be more or less than the number illustrated. Game play generally proceeds as described in connection with the Gold Fi$h game except that the Beat the Clock basic game utilizes its own artwork and math. Included among the plurality of basic game outcomes are one or more start-bonus outcomes for triggering play of bonus games. In the illustrated example the appearance of three, four, or five scattered Beat the Clock symbols 124 triggers a Challenge bonus game.

Figure 18:
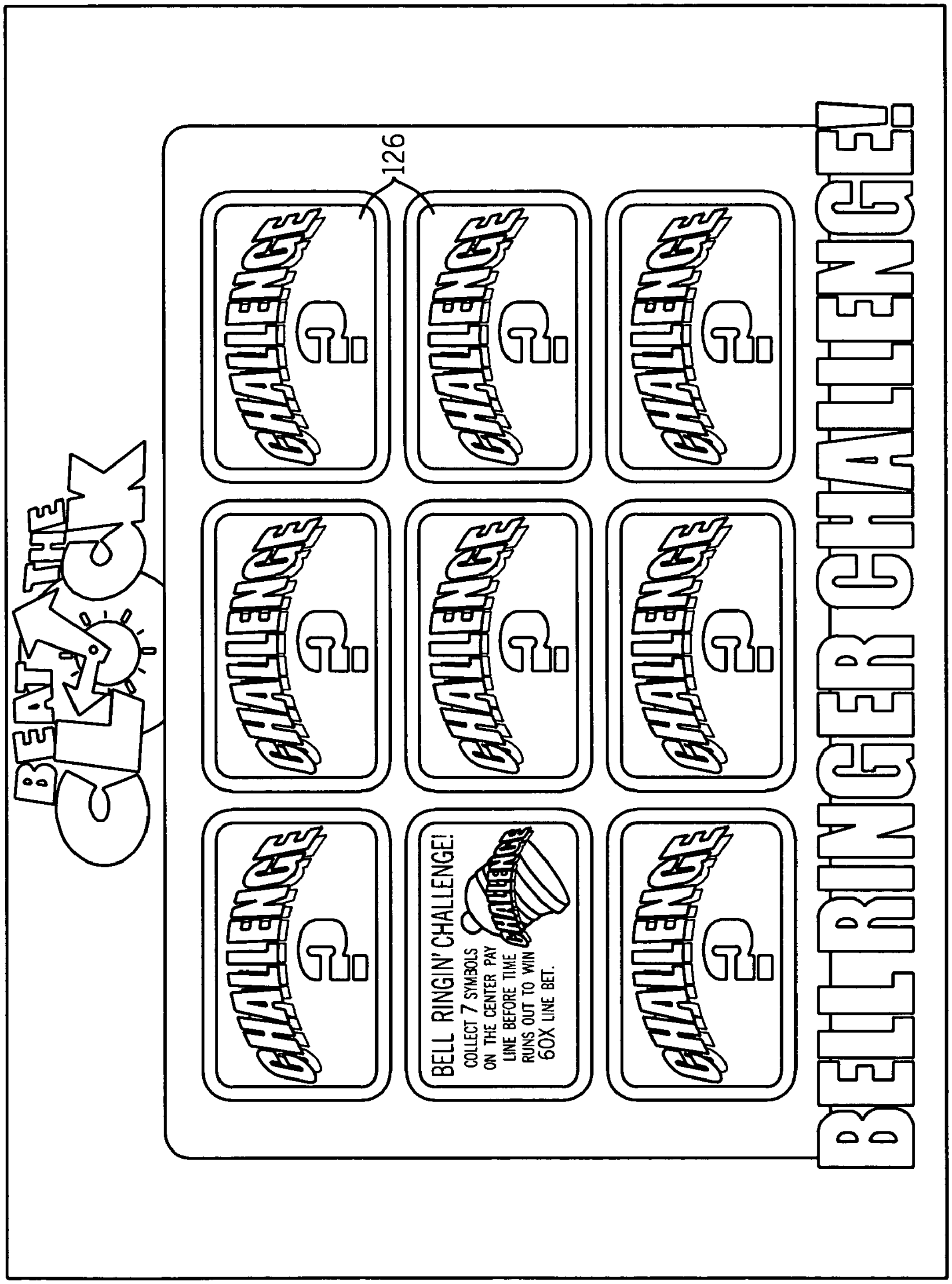
FIGS. 18 and 19 are display images associated with a bonus game conducted on the gaming machine in FIG. 15.
Figure 19:
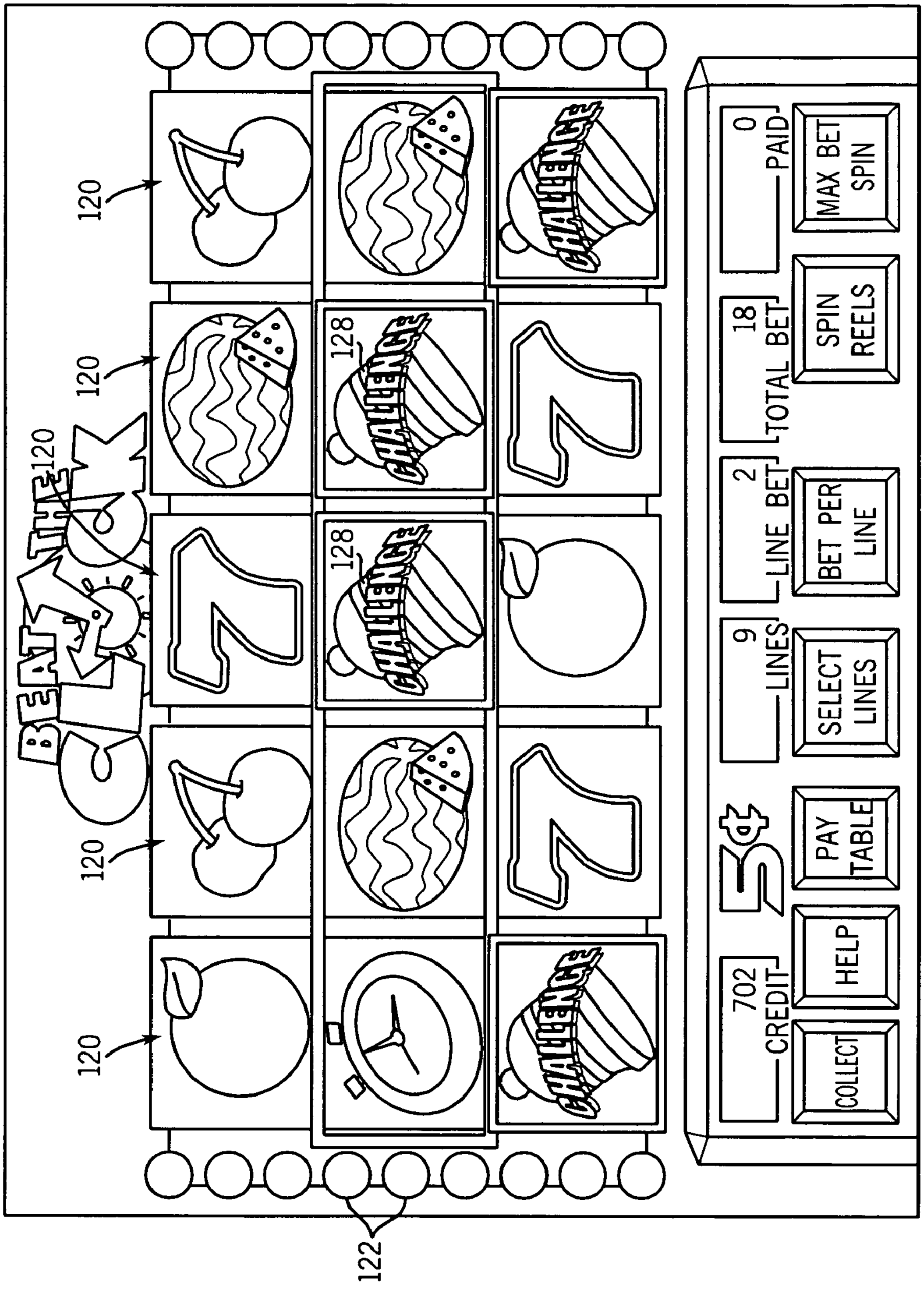

The Challenge bonus game proceeds as follows. Referring to FIG. 18, the video display 102 replaces the image of reels with an image of an array of cards 126. The player is prompted to select one of the cards 126. In the illustrated example, the selected card is a "Bell Ringin' Challenge" card. In this challenge, the player is awarded a number of free spins of the reels. The number of free spins varies with the number of Beat the Clock symbols 124 that triggered the bonus game: three symbols awards four free spins; four symbols awards eight free spins; and five symbols awards twelve free spins. If the player can "collect" seven Bell symbols along the horizontal center pay line during the free spins, the player is awarded a bonus (e.g., 60× line bet). FIG. 19, for example, depicts a free spin that results in two Bell symbols 128 along the horizontal center pay line. The challenges and bonuses may vary according to the symbol shown on the selected card. In addition to being awarded a bonus for winning the Challenge round, any winning symbol combinations that would yield payoffs if they occur during the basic slot game yield such payoffs if they occur during the free spins.

Figure 20:
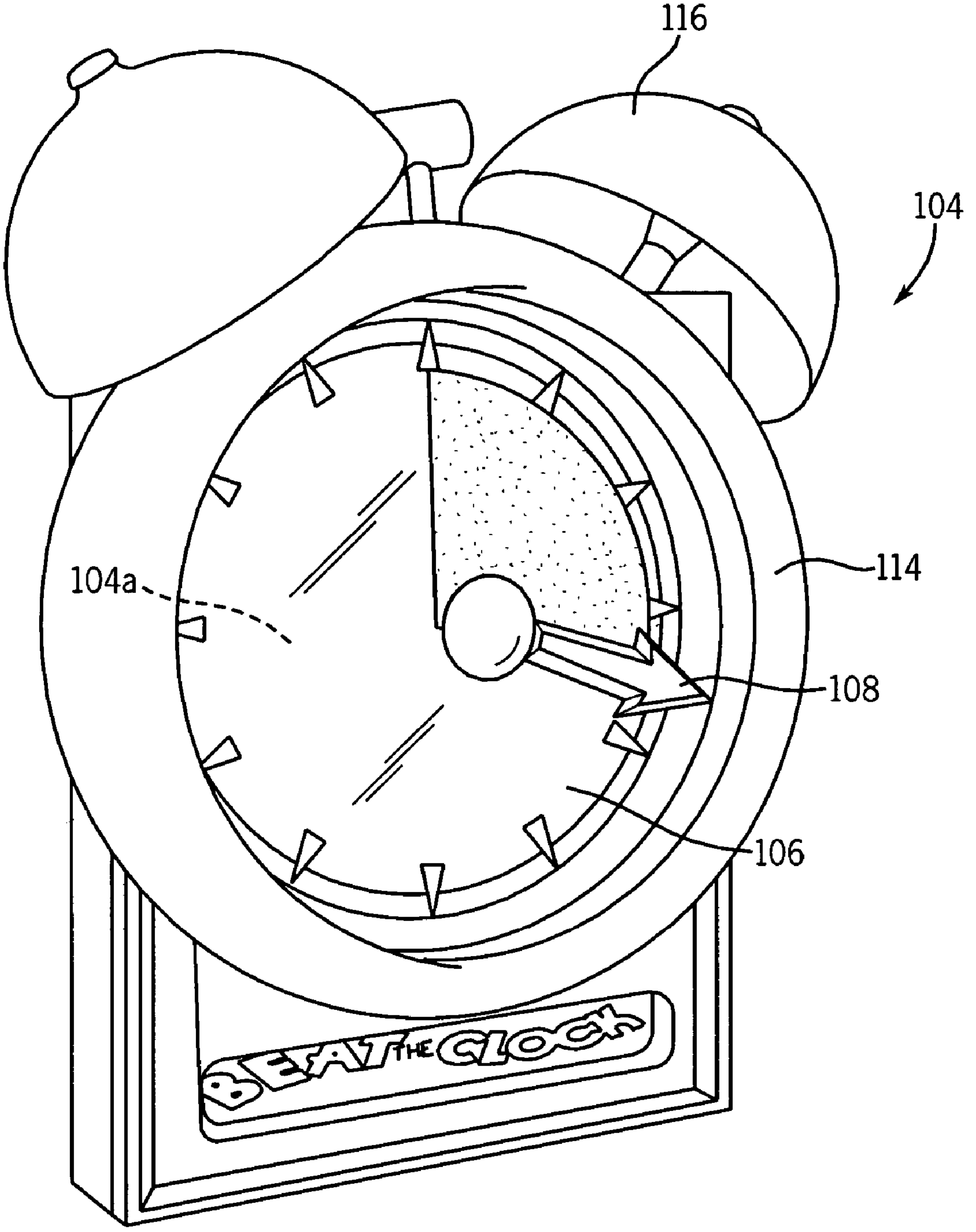
FIGS. 20 and 21 are perspective views of the integrated clock display showing its use to conduct the bonus game.

Referring to FIG. 20, the Challenge round begins with time placed on the clock display 104. The amount of time put on the clock display 104 varies with the number of Beat the Clock symbols 124 that triggered the bonus game: 20 seconds for three symbols; 40 seconds for four symbols; and 60 seconds for five symbols. Because each free spin in the bonus round lasts 5 seconds, the number of seconds is equivalent to four, eight, and twelve free spins, respectively. The Challenge round continues until the time on the clock display 104 runs out.

Figure 21:
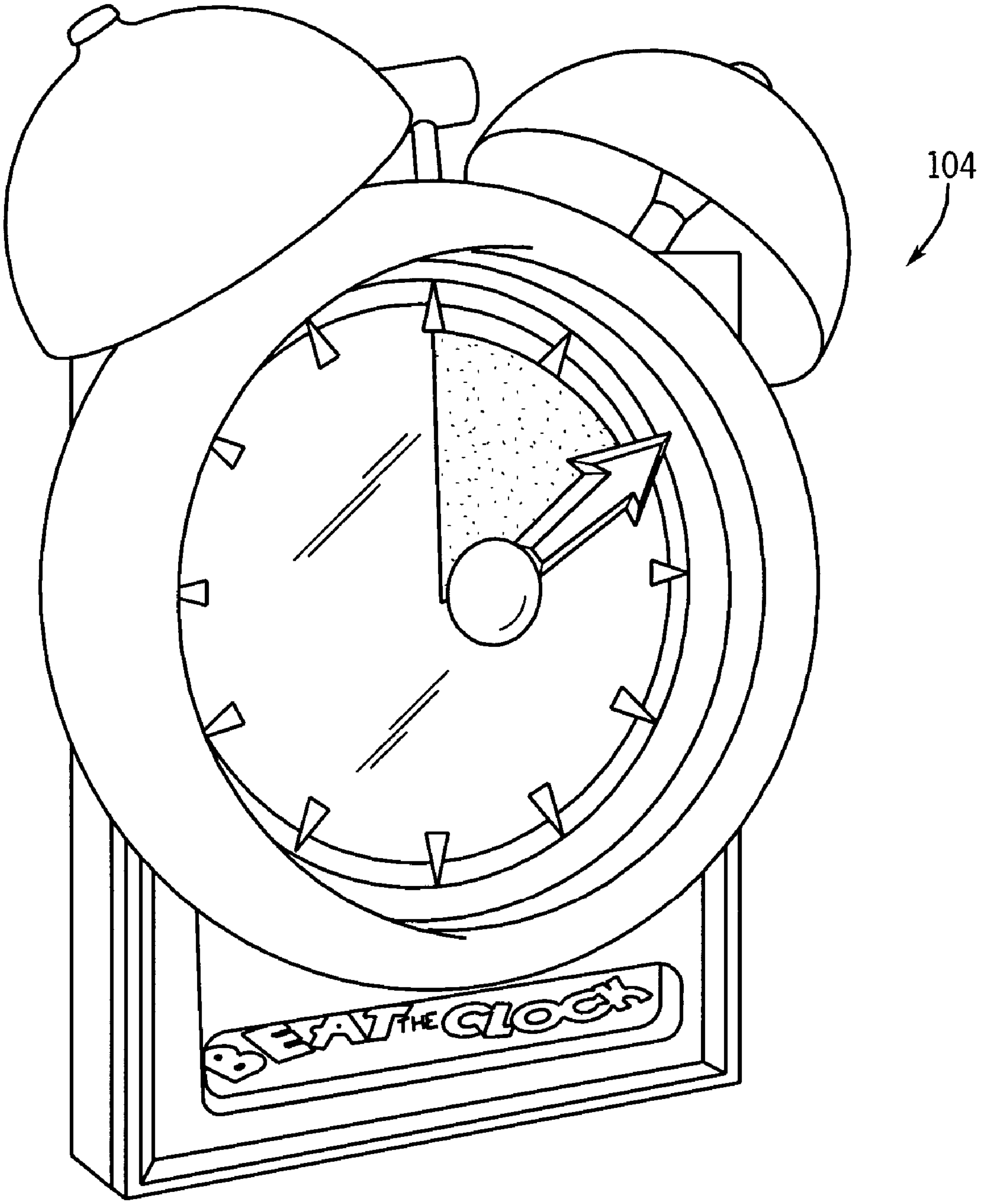

In the illustrated example, the bonus game was triggered by three scattered Beat the Clock symbols 124, and therefore 20 seconds (equivalent to 4 free spins) are placed on the clock display 104. To represent 20 seconds, the disc 106 (and therefore the hand 108 molded thereto) rotates clockwise until the hand 108 points to the 20 second mark, and the video screen 104*a* fills the pie-shaped area between the zero second mark and the 20 second mark with a color. As the clock display 104 counts down to zero, the disc 106 rotates counterclockwise and the video screen 104*a*, in turn, displays a countdown effect of vanishing colored pie-shaped segments. FIG. 21, for example, depicts the clock display 104 with 10 seconds remaining. At the conclusion of the bonus game, the CPU shifts operation back to the basic slot game.

While the present invention has been described with reference to one or more particular embodiments, those skilled in the art will recognize that many changes may be made thereto without departing from the spirit and scope of the present invention.

For example, the structures 14*b*, 54*b-d*, 104*b* for displaying non-video artwork may be two-dimensional (2D), three-dimensional (3D), or a combination thereof. The structures may be stationary, movable, or a combination thereof. A structure may have a stationary component and a component movable relative to the stationary component. If movable, the structure may be movable in one, two, or three dimensions and in one or more directions.

Instead of positioning the structures 54*b-d* in FIG. 9 in front of the video screen 54*a*, the positions may be reversed such that the video screen is positioned in front of the structures. In this case, the video screen is of the transmissive type (e.g., transmissive LCD) as disclosed in U.S. Pat. No. 6,517,433 to Loose et al., which is incorporated herein by reference in its entirety. The transmissive video screen may display video images that are selectively superimposed, in whole or in part, over the structures 54*b-d* to create the desired visual effects. The superimposed video image may be interactive with the structures 54*b-d*, may be static or dynamic, and may include such graphics as bonuses, special effects, thematic scenery, and instructional information.

The basic game need not comprise a reel slot game, but may comprise virtually any type of wagering game or combination of wagering games having outcomes and presentations with an integrated image formed by integrated video and non-video displays. The basic game may, for example, be video or mechanical slots, poker, keno, bingo, blackjack, or roulette. Additionally, the basic game may trigger a win of a progressive jackpot and bonus games and events in addition to the ones that present the integrated image. Such other bonus games and events may be conducted on the primary display, one or more secondary displays, or a combination thereof.

Each of these embodiments and obvious variations thereof is construed as falling within the spirit and scope of the claimed invention, which is set forth in the following claims.

What is claimed is:

1. A gaming apparatus for conducting a wagering game, comprising:

a video screen for displaying a dynamic video image; and a physical structure for displaying non-video artwork, the dynamic video image and non-video artwork being visually blended to form an integrated dynamic image associated with the wagering game, the physical structure covering a portion, but not all, of the video screen and being moveable relative to the video screen, the movable physical structure interacting with the dynamic video image.

2. The apparatus of claim 1, wherein the integrated image represents a randomly selected event of the wagering game.

3. The apparatus of claim 1, wherein the non-video artwork includes stationary indicia.

4. The apparatus of claim 1, wherein the structure is selectively illuminated to vary in color.

5. The apparatus of claim 4, wherein changes to the color of the structure are synchronized with changes to the video image.

6. The apparatus of claim 1, wherein the video screen is included in an LCD display.

7. The apparatus of claim 1, wherein the structure exposes a portion of the video screen, the exposed portion having a non-rectangular shape.

8. The apparatus of claim 1, wherein the structure is three-dimensional.

9. The apparatus of claim 1, wherein the movable structure identifies one or more elements in the video image.

10. The apparatus of claim 1, wherein the structure includes a physical or virtual hole exposing an area of the video screen, the video image including an award in the area.

11. A gaming apparatus for conducting a wagering game, comprising:

a video screen;

a physical structure for displaying non-video artwork, the physical structure covering a portion, but not all, of the video screen, the physical structure being movable relative to the video screen; and a controller for generating a dynamic video image on the video screen, the dynamic video image and non-video artwork being visually blended to form an integrated image associated with the wagering game, the moveable structure interacting with the dynamic video image.

12. The apparatus of claim 11, wherein the integrated image represents a randomly selected event of the wagering game.

13. The apparatus of claim 11, wherein the non-video artwork includes stationary indicia.

14. The apparatus of claim 13, wherein the structure is selectively illuminated to vary in color.

15. The apparatus of claim 14, wherein changes to the color of the structure are synchronized with changes to the video image.

16. The apparatus of claim 11, wherein the video screen is included in an LCD display.

17. The apparatus of claim 11, wherein the structure exposes a portion of the video screen, the exposed portion having a non-rectangular shape.

18. The apparatus of claim 11, wherein the structure is three-dimensional.

19. The apparatus of claim 11, wherein the movable structure identifies one or more elements in the video image.

20. The apparatus of claim 11, wherein the structure includes a physical or virtual hole exposing an area of the video screen, the video image including an award in the area.

21. A method of conducting a wagering game on a gaming machine, comprising:

receiving a wager to play the wagering game;

displaying a dynamic video image on a video screen;

displaying non-video artwork on a physical structure, the physical structure covering a portion, but not all, of the video screen, the dynamic video image and non-video artwork being visually blended to form an integrated image associated with the wagering game;

moving the physical structure relative to the video screen; and interacting the moving structure with the video image.

22. The method of claim 21, wherein the integrated image represents a randomly selected event of the wagering game.

23. The method of claim 21, wherein the non-video artwork includes stationary indicia.

24. The method of claim 23, further including selectively illuminating the structure to vary in color.

25. The method of claim 24, wherein the illuminating step includes synchronizing changes to the color of the structure with changes to the video image.

26. The method of claim 21, wherein the video screen is included in an LCD display.

27. The method of claim 21, further including randomly selecting an outcome for the wagering game, the integrated image being associated with the outcome.

28. The method of claim 21, wherein the structure exposes a portion of the video screen, the exposed portion having a non-rectangular shape.

29. The method of claim 21, wherein the structure is three-dimensional.

30. The method of claim 21, wherein the interacting step includes identifying one or more elements in the video image with the moving structure.

31. The method of claim 21, wherein the structure includes a physical or virtual hole exposing an area of the video screen, the video image including an award in the area.

* * * * *